(12) United States Patent
Yamamoto et al.

(10) Patent No.: US 6,292,441 B1
(45) Date of Patent: Sep. 18, 2001

(54) OPTICAL HEAD DEVICE, OPTICAL INFORMATION APPARATUS, AND METHOD FOR DETECTING FOCUS ERROR SIGNAL

(75) Inventors: Hiroaki Yamamoto, Hyogo-ken; Daisuke Ogata, Amagasaki; Ken'ichi Kasazumi, Takatsuki; Seiji Nishino, Osaka; Hidenori Wada, Sakai; Sadao Mizuno, Ibaraki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/061,822

(22) Filed: Apr. 16, 1998

(30) Foreign Application Priority Data

Apr. 16, 1997 (JP) .................................................. 9-098780

(51) Int. Cl.[7] ....................................................... G11B 7/00
(52) U.S. Cl. .................................... 369/44.23; 369/44.41; 369/112.15
(58) Field of Search ............................. 369/44.41, 44.42, 369/44.23, 44.25, 112.15, 109, 110

(56) References Cited

U.S. PATENT DOCUMENTS

| 5,353,267 | * | 10/1994 | Katayama | 369/44.41 |
|---|---|---|---|---|
| 5,406,542 | * | 4/1995 | Morimoto | 369/44.41 |
| 5,434,708 | | 7/1995 | Gupta et al. | |
| 5,526,144 | | 6/1996 | Dickson . | |
| 5,610,883 | * | 3/1997 | Yanagawa | 369/44.41 |
| 5,850,081 | * | 12/1998 | Yanagisawa | 369/44.41 |
| 5,936,920 | * | 8/1999 | Noda | 369/44.41 |
| 5,959,953 | * | 9/1999 | Alon | 369/44.41 |

FOREIGN PATENT DOCUMENTS

| 63-314502 | 12/1988 | (JP) . |
|---|---|---|
| 5-298721 | 11/1993 | (JP) . |
| 7-57295 | 3/1995 | (JP) . |
| 8-22624 | 1/1996 | (JP) . |
| 2646782 | 5/1997 | (JP) . |

* cited by examiner

Primary Examiner—Nabil Hindi
(74) Attorney, Agent, or Firm—Ratner & Prestia

(57) ABSTRACT

An optical head device includes a light source for emitting a light beam having a predetermined wavelength, an optical system for converging the light beam emitted from the light source on an information medium, and a light detector for receiving the light beam reflected from the information medium and detecting a focus error signal based on the received light beam. The light detector includes a plurality of pairs of photodetectors. The light detector generates the focus error signal based on a differential signal generated by each pair of the plurality of pairs of photodetectors. The plurality of pairs of photodetectors are arranged so that a fluctuation in the differential signal generated by at least one of the pairs of the plurality of pairs of photodetectors is cancelled by a fluctuation in the differential signal generated by at least another of the pairs of the plurality of pairs of photodetectors.

16 Claims, 21 Drawing Sheets

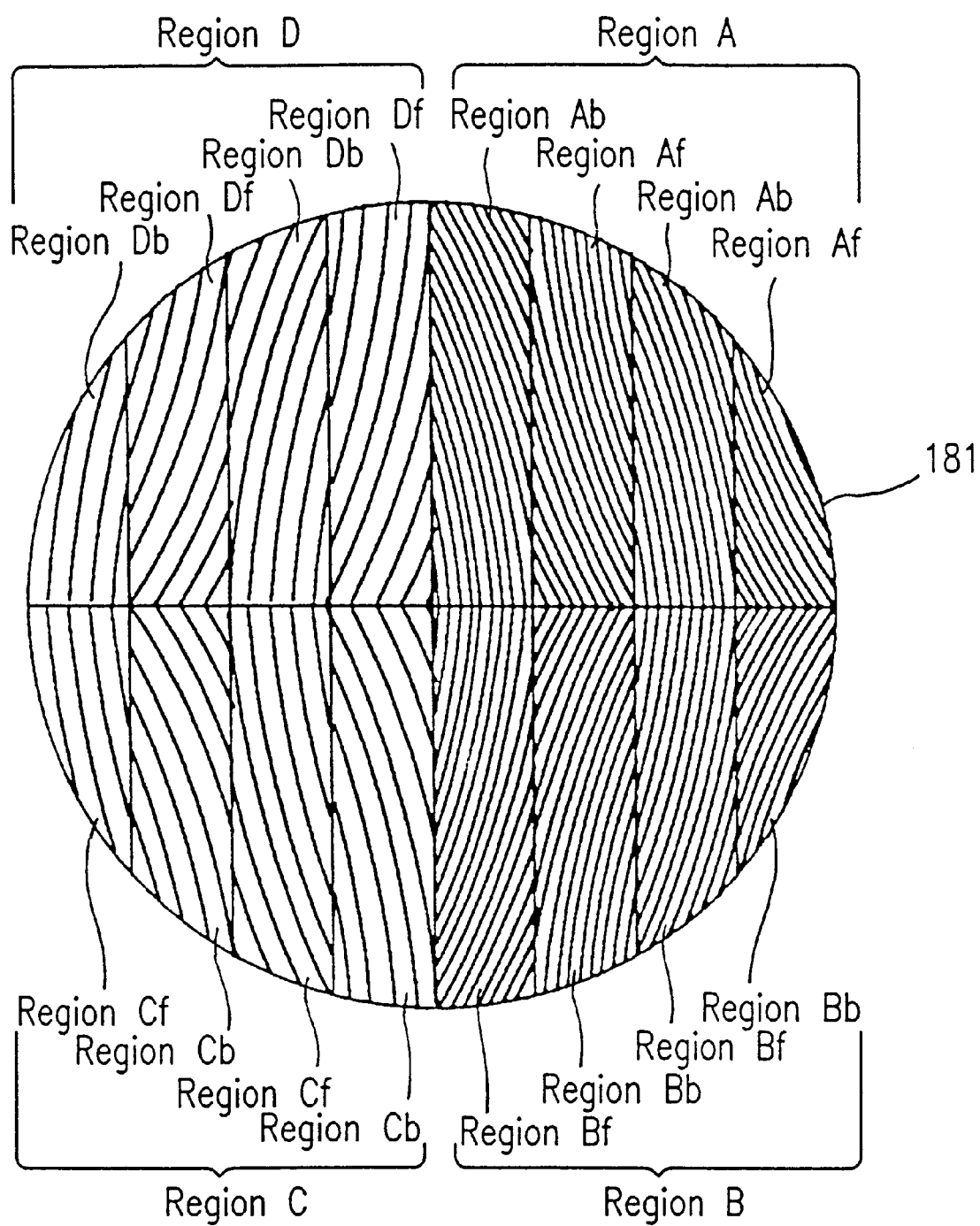
FIG.4
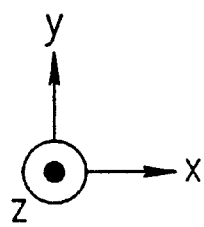

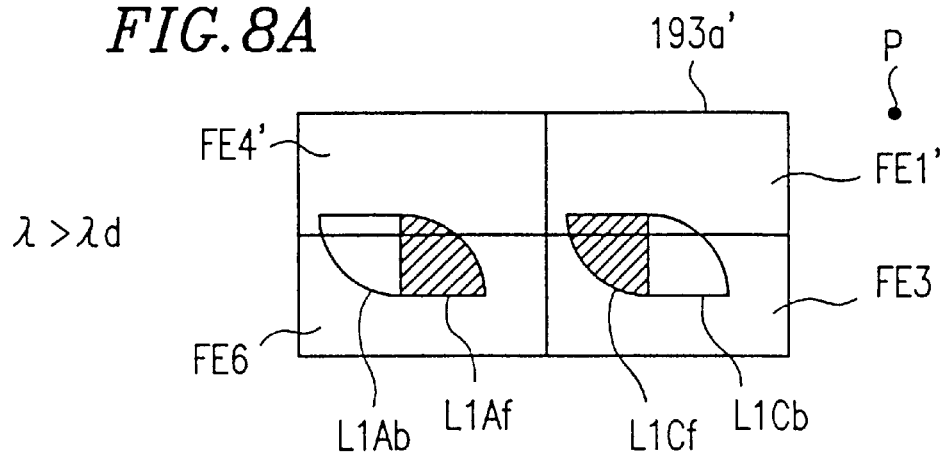
FIG.8A
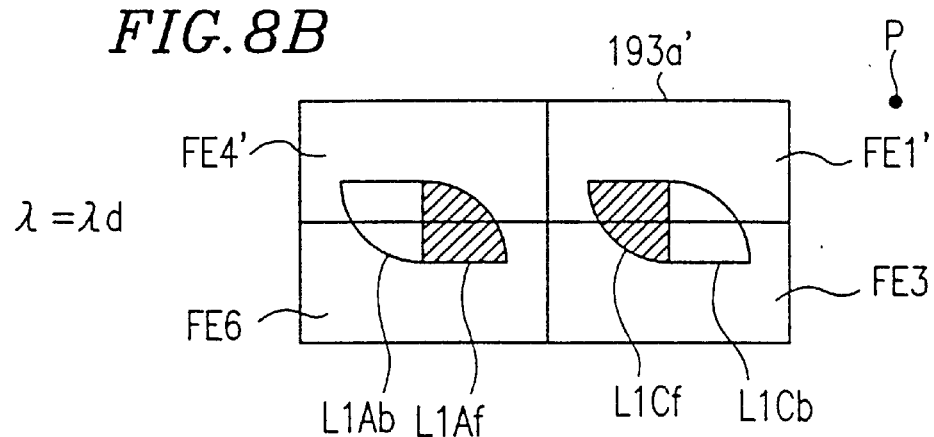
FIG.8B
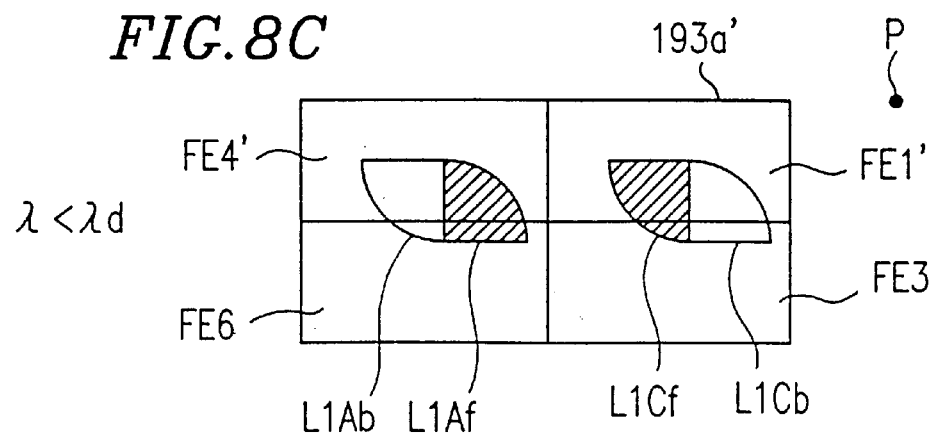
FIG.8C
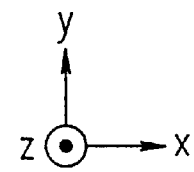

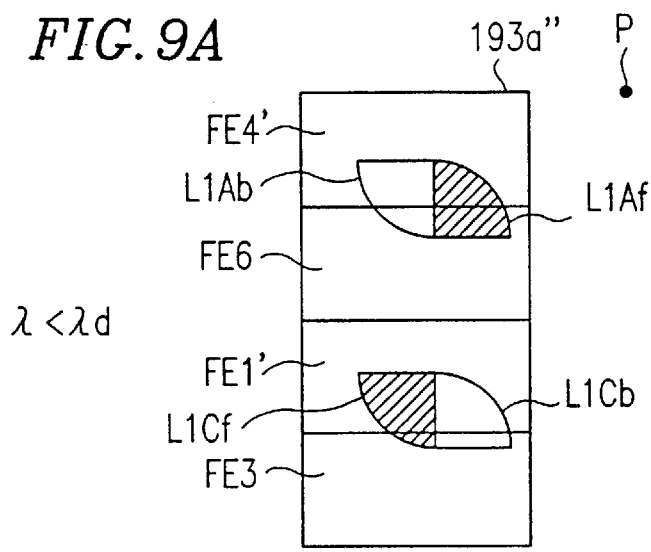
FIG. 9A
$\lambda < \lambda d$
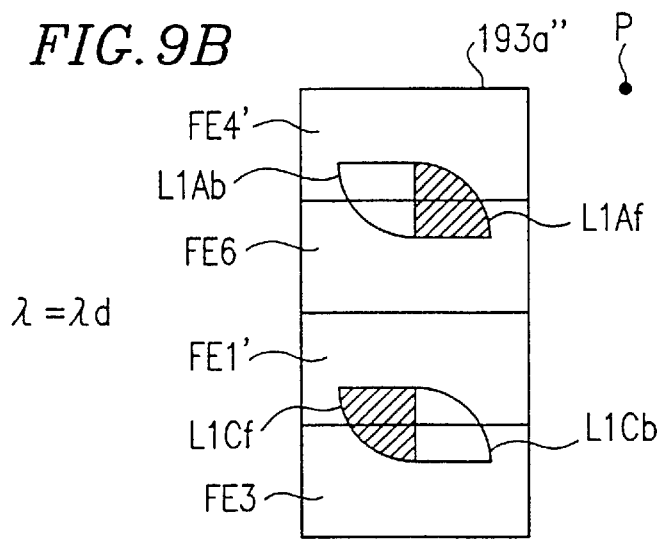
FIG. 9B
$\lambda = \lambda d$
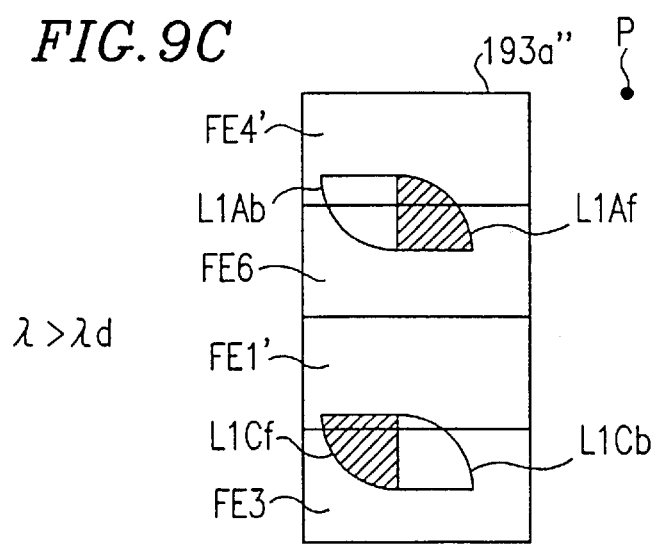
FIG. 9C
$\lambda > \lambda d$
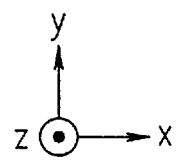

FIG.12
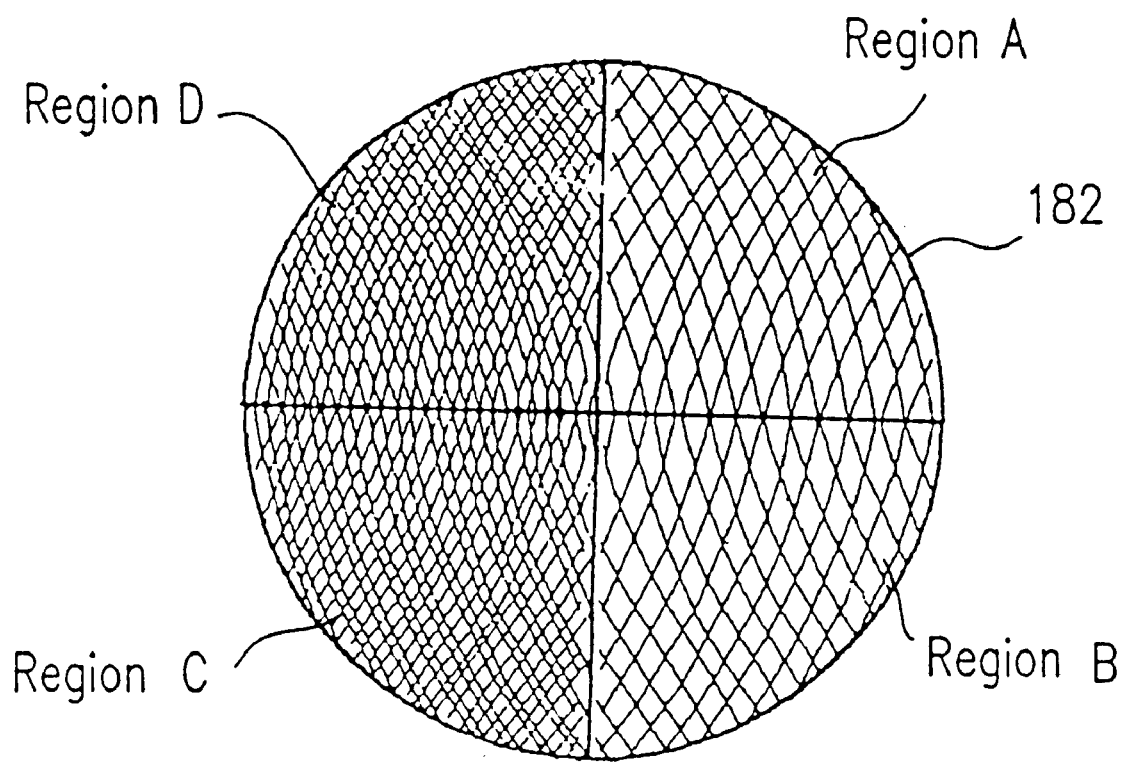
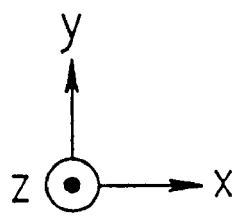

FIG. 19 PRIOR ART
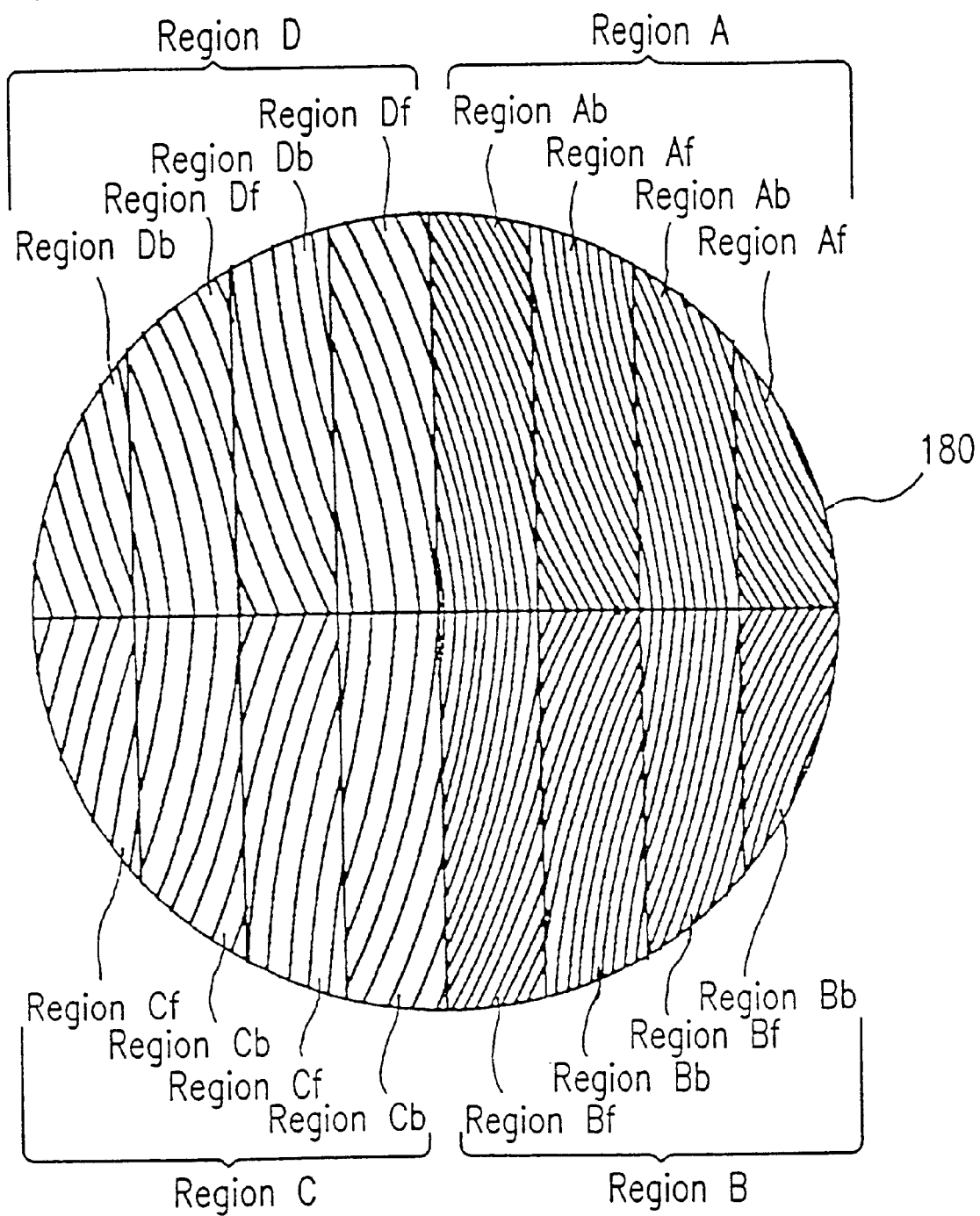
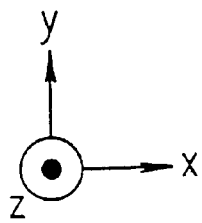

OPTICAL HEAD DEVICE, OPTICAL INFORMATION APPARATUS, AND METHOD FOR DETECTING FOCUS ERROR SIGNAL

BACKGROUND OF THE INVENTION

1. Field of the Invention

The present invention relates to an optical head device for recording information on an information medium or reproducing or erasing information which has been recorded on an information medium; an optical information apparatus including an optical head device; and a method for detecting a tracking error.

2. Description of the Related Art

In recent years, improvements have been made in optical disks so that various optical disks have been developed, e.g., read/write optical disks, read-only (ROM) optical disks. Against such backgrounds, optical head devices have been proposed which are capable of reproducing information carried on various kinds of optical disks. Such an optical head device is disclosed in, for example, Japanese Laid-Open Publication No. 8-022624.

Hereinafter, a conventional optical head device 600 will be described with reference to FIG. 18.

FIG. 18 illustrates a conventional optical head device 600. FIG. 18 shows x, y, and z axes, which are employed for clarifying spatial directions in the figure. Unless otherwise specified, it is assumed that each of the x, y, and z axes represents the same direction throughout the present specification and the figures. In the case where one or more mirror faces are present in an optical system, the x, y, and z axes will represent axes of coordinates in a mirror image created on such a mirror face throughout the specification and the figures.

The optical head device 600 includes a LD-PD unit 160, a collimate lens 102, a polarization anisotropic hologram 180 (hereinafter referred to as "PA holo-gram"), a ¼ wavelength plate 115, and an object lens 103.

The LD-PD unit 160 includes a light source 2 for emitting a light beam L0, a light detector 191 for receiving a light beam L1 reflected from an information medium 105, and a light detector 192 for receiving a light beam L2 reflected from the information medium 105. The light source 2 and the light detectors 191 and 192 take specific relative positions with respect to one another in the LD-PD unit 160.

The optical head device 600 further includes a support member 106 for supporting the PA hologram 180, ¼ wavelength plate 115, and the object lens 103, as well as a driving section 112 for driving the support member 106 along the z-axis direction.

The information medium 105 is positioned so that the tangential direction thereof substantially coincides with the y-axis direction.

Hereinafter, the operation of the optical head device 600 will be described.

The light source 2 emits the linear polarization light beam L0, which is polarized along the x-axis direction. The light beam L0 emitted from the light source 2 is converted into collimated light through the collimate lens 102. Thereafter, the light beam L0 is transmitted through the PA hologram 180 without being refracted by the PA hologram 180. The polarization state of the light beam L0 is changed from linear polarization into circular polarization through the ¼ wavelength plate 115. The light beam L0 is focused on the information medium 105 through the object lens 103.

The light beam reflected from the information medium 105 travels in the opposite direction from the direction of travel of the light beam L0 emitted from the light source 2, so as to travel back through the ¼ wavelength plate 115. The polarization state of this light beam is changed from circular polarization into linear polarization through the ¼ wavelength plate 115. The polarization direction of the linear polarization light is a direction (i.e., the y-axis direction) which is perpendicular to the polarization direction of the light beam L0 emitted from the light source 2. The light beam which has been transmitted through the ¼ wavelength plate 115 is split by the PA hologram 180 into +1st diffracted light L1 and −1st diffracted light L2. The +1st diffracted light L1 enters the light detector 191. The −1st diffracted light L2 enters the light detector 192. The light detectors 191 and 192 detect servo signals and/or a signal representing the information recorded on the information medium 105.

Hereinafter, the details of the signal detection process will be described with reference to FIGS. 19 and 20.

FIG. 19 schematically represents the pattern of the PA hologram 180. The PA hologram 180 is divided into four regions (regions A, B, C, and D) by a line which intersects the center of the PA hologram 180 and extends in parallel to the x axis and a line which intersects the center of the PA hologram 180 and extends in parallel to the y axis. Herein, the center of the PA hologram 180 coincides with its optic axis.

Each of regions A, B, C, and D is subdivided into a plurality of strip regions by a plurality of lines extending in parallel to the y axis. For example, regions Ab and regions Af alternate in region A; regions Bb and regions Bf alternate in region B; regions Cb and regions Cf alternate in region C; and regions Db and regions Df alternate in region D.

In FIG. 19, regions which are indicated by the same region name have a hologram pattern generated from the same function; regions which are indicated by different region names have hologram patterns generated from different functions. As a result, regions indicated by different region names diffract light beams in different directions or wave fronts.

FIG. 20 illustrates a light-sensitive surface 191a of the light detector 191 and a light-sensitive surface 192a of the light detector 192 provided in the LD-PD unit 160.

The light-sensitive surfaces 191a and 192a are disposed in a symmetrical manner with respect to an emission point (i.e., a point from which the light beam L0 is emitted) or a point equivalent to the emission point. In FIG. 20, point P represents the emission point or a point equivalent to the emission point.

The light-sensitive surface 191a is divided into three regions (regions FE1, FE2, and FE3) by two lines L1X1 and L1X2 extending in parallel to the x axis.

The light-sensitive surface 192a is divided into four regions (regions TEa, TEb, TEc, and TEd) by a line L2X1 extending in parallel to the x axis and a line L2Y1 extending in parallel to the y axis.

Due to the diffraction action of the PA hologram 180, the light beam reflected from the information medium 105 is converted into the +1st diffracted light L1 and the −1st diffracted light L2. The +1st diffracted light L1 enters the light-sensitive surface 191a, whereas the −1st diffracted light L2 enters the light-sensitive surface 192a.

Light spots are created on the light-sensitive surface 191a corresponding to the light beams entering the respective regions of the PA hologram 180. The light spots L1Ab, L1Af, L1Bb, L1Bf, L1Cb, L1Cf, L1Db, and L1Df are formed by light beams entering regions Ab, Af, Bb, Bf, Cb, Cf, Db, and Df, respectively, of the PA hologram 180.

Light spots are created on the light-sensitive surface 192a corresponding to the light beams entering the respective regions of the PA hologram 180. The light spots L2Ab, L2Af, L2Bb, L2Bf, L2Cb, L2Cf, L2Db, and L2Df are formed by light beams entering regions Ab, Af, Bb, Bf, Cb, Cf, Db, and Df, respectively, of the PA holo-ram 180.

The PA hologram 180 is designed so as to satisfy the following conditions (1) to (4) in a state (defined as the "focused state") where the size of the light spot converged on the recording face of information medium 105 becomes minimum:

(1) a light beam entering region Ab (FIG. 19) is converged at a point behind the light-sensitive surface 191a, whereas a light beam entering region Af (FIG. 19) is converged at a point in front of the light-sensitive surface 191a;

(2) a light beam entering region Bb (FIG. 19) is converged at a point behind the light-sensitive surface 191a, whereas a light beam entering region Bf (FIG. 19) is converged at a point in front of the light-sensitive surface 191a;

(3) a light beam entering region Cb (FIG. 19) is converged at a point behind the light-sensitive surface 191a, whereas a light beam entering region Cf (FIG. 19) is converged at a point in front of the light-sensitive surface 191a; and (4) a light beam entering region Db (FIG. 19) is converged at a point behind the light-sensitive surface 191a, whereas a light beam entering region Df (FIG. 19) is converged at a point in front of the light-sensitive surface 191a.

The light detector 191 generates a focus error signal FE in accordance with equation 1 below.

$$FE = S_{FE1} - (S_{FE2} + S_{FE3}) \quad \text{eq. 1}$$

where $S_{FE1}$ to $S_{FE3}$ represent the respective signals detected in regions FE1 to FE3 of the light-sensitive surface 191a.

The light detector 192 generates a tracking error signal TE. The tracking error signal TE can be generated in either a push-pull method or a phase difference method, depending on the type of the information medium 105. The push-pull method is employed in the case where the information medium 105 is an optical disk having continuous grooves (e.g., a read/write optical disk). The phase difference method is employed in the case where the information medium 105 is an optical disk carrying track information in the form of pits (e.g., a ROM optical disk).

In the case where the push-pull method is employed, the tracking error signal TE is generated in accordance with equation 2 below:

$$TE = (S_{TEa} + S_{TEb}) - (S_{TEc} + S_{TEd}) \quad \text{eq. 2}$$

where $S_{TEa}$ to $S_{TEd}$ represent the respective signals detected in regions TEa to TEd of the light-sensitive surface 192a.

In the case where the phase difference method is employed, the tracking error signal TE is generated based on a comparison between the phase of the sum signal ($S_{TEa} + S_{TEc}$) and the phase of the sum signal ($S_{TEb} + S_{TEd}$).

A signal representing the information recorded on the information medium 105 can be obtained by summing up all the signals detected in the respective regions of the light-sensitive surface 191a of the light detector 191. Alternatively, such an information signal can be obtained by summing up all the signals detected in the respective regions of the light-sensitive surface 192a of the light detector 192. Alternatively, such an information signal can be obtained by summing up all the signals detected in the respective regions of the light-sensitive surface 191a of the light detector 191 and all the signals detected in the respective regions of the light-sensitive surface 192a of the light detector 192.

The conventional optical head device 600 employs the PA hologram 180 as a diffraction element. Therefore, if the wavelength of an incident light beam deviates from its design value, a deviation results in the angle of diffraction effected by the PA hologram 180. This may cause an offset in the position of the light spot to be formed on the light detector 191 from the designed position. Although the position of each light spot is designed so that the focus error signal FE takes a zero (0) value in a focused state (defined above) in the optical head device 600, an offset in the position of the light spot for the above-mentioned reason can cause a non-zero ($\neq 0$) value of the focus error signal FE in a focused state.

Thus, the conventional optical head device 600 has a problem in that it may have a focusing offset due to a deviation (i.e., an increase or decrease relative to the design value) in the wavelength of a light beam.

For similar reasons, there is also a problem in that a focusing offset may occur due to a deviation in the focal length of the collimate lens 102 from its design value.

A focusing offset can render the operation of an optical head device significantly unstable, possibly making it impossible to reproduce the signal recorded on the information medium 105 in an extreme case.

FIG. 21 illustrates the relationship between the displacement of the information medium 105 (from a focused position) and the focus error signal FE in the conventional optical head device 600. As seen from FIG. 21, the characteristics profile of the focus error signal FE representing displacements of the information medium 105 away from the focused position and the characteristics profile of the focus error signal FE representing displacements of the information medium 105 toward the focused position are asymmetric. Such asymmetry in the characteristics of the focus error signal FE can unfavorably affect the servo characteristics of the system.

Furthermore, the conventional optical head device 600 has a problem in that the value of the focus error signal FE does not converge to zero (that is, the profile of the focus error signal FE characteristics spreads out on both sides) even in the case where the displacement of the information medium 105 from the focused position is sufficiently large. While this does not present a problem in reproducing a signal recorded on a single-layer optical disk (e.g., a CD), but may unfavorably affect the reproduction of a signal recorded on a double-layer disk (e.g., a DVD).

FIG. 22 illustrates the characteristics of the focus error signal FE in the case where information recorded on a double-layer disk is reproduced by the conventional optical head device 600. As seen from FIG. 22, a focusing offset is created due to the interaction between a focus error signal generated by reflected light from a first layer and a focus error signal generated by reflected light from a second layer. The focusing offset can deteriorate the system characteristics.

SUMMARY OF THE INVENTION

An optical head device according to the present invention includes a light source for emitting a light beam having a predetermined wavelength, an optical system for converging the light beam emitted from the light source on an information medium, and a light detector for receiving the light beam reflected from the information medium and detecting a focus error signal based on the received light beam, wherein the light detector includes a plurality of pairs of photodetectors; the light detector generates the focus error signal based on a differential signal generated by each pair of the plurality of pairs of photodetectors; and the plurality of pairs of photodetectors are arranged so that a fluctuation in the differential signal generated by at least one of the pairs of the plurality of pairs of photodetectors is cancelled by a fluctuation in the differential signal generated by at least another of the pairs of the plurality of pairs of photodetectors.

In one embodiment of the invention, the optical head device further includes a holographic optical element, and the light beam reflected from the information medium is incident on the light detector via the holographic optical element.

In another embodiment of the invention, the optical head device further includes a further light detector for detecting a tracking error signal, and the holographic optical element converts the light beam into +1st diffracted light and −1st diffracted light, the +1st diffracted light being incident on the light detector and the −1st diffracted light being incident on the further light detector.

In still another embodiment of the invention, the plurality of pairs of photodetectors include a first pair of photodetectors and a second pair of photodetectors; and a fluctuation in the differential signal generated by the first pair of photodetectors is cancelled by a fluctuation in the differential signal generated by the second pair of photodetectors.

In still another embodiment of the invention, the first pair of photodetectors and the second pair of photodetectors are arranged along a direction which is substantially perpendicular to a tangential direction of the information medium.

Alternatively, the optical head device according to the present invention includes a light source for emitting a light beam having a predetermined wavelength, an optical system for converging the light beam emitted from the light source on an information medium, and a light detector for receiving the light beam reflected from the information medium and detecting a focus error signal based on the received light beam, wherein the light detector includes a light-sensitive surface having first, second, third, and fourth regions, the first, second, third, and fourth regions being arranged along a tangential direction of the information medium in the following order: the third region, the first region, the second region, and the fourth region; and the light detector generates the focus error signal based on a differential signal between a sum of signals detected in the first region and the fourth region and a sum of signals detected in the second region and the third region.

In one embodiment of the invention, the optical head device further includes a holographic optical element, and the light beam reflected from the information medium is incident on the light detector via the holographic optical element.

In another embodiment of the invention, the optical head device further includes a further light detector for detecting a tracking error signal; and the holographic optical element converts the light beam into +1st diffracted light and −1st diffracted light, the +1st diffracted light being incident on the light detector and the −1st diffracted light being incident on the further light detector.

An optical information apparatus according to the present invention includes an optical head device, a driving device for driving the optical head device, and a rotation mechanism for rotating the information medium, wherein the optical head device includes a light source for emitting a light beam having a predetermined wavelength, an optical system for converging the light beam emitted from the light source on an information medium, and a light detector for receiving the light beam reflected from the information medium and detecting a focus error signal based on the received light beam; the light detector includes a plurality of pairs of photodetectors; the light detector generates the focus error signal based on a differential signal generated by each pair of the plurality of pairs of photodetectors; and the plurality of pairs of photodetectors are arranged so that a fluctuation in the differential signal generated by at least one of the pairs of the plurality of pairs of photodetectors is cancelled by a fluctuation in the differential signal generated by at least another of the pairs of the plurality of pairs of photodetectors.

In one embodiment of the invention, the optical information apparatus includes an optical head device, a driving device for driving the optical head device, and a rotation mechanism for rotating the information medium, wherein the optical head device includes a light source for emitting a light beam having a predetermined wavelength, an optical system for converging the light beam emitted from the light source on an information medium, and a light detector for receiving the light beam reflected from the information medium and detecting a focus error signal based on the received light beam; the light detector includes a light-sensitive surface having first, second, third, and fourth regions, the first, second, third, and fourth regions being arranged along a tangential direction of the information medium in the following order: the third region, the first region, the second region, and the fourth region; and the light detector generates the focus error signal based on a differential signal between a sum of signals detected in the first region and the fourth region and a sum of signals detected in the second region and the third region.

A method for detecting a focus error signal according to the present invention by using a light detector for receiving a light beam reflected from an information medium, the light detector including a plurality of photodetectors, includes generating the focus error signal based on a differential signal generated by each pair of the plurality of pairs of photodetectors, a fluctuation in the differential signal generated by at least one of the pairs of the plurality of pairs of photodetectors being cancelled by a fluctuation in the differential signal generated by at least another of the pairs of the plurality of pairs of photodetectors.

Alternatively, the method for detecting a focus error signal according to the present invention by using a light detector for receiving a light beam reflected from an information medium, the light detector including a light-sensitive surface having first, second, third, and fourth regions, the first, second, third, and fourth regions being arranged along a tangential direction of the information medium in the following order: the third region, the first region, the second region, and the fourth region, includes generating the focus error signal based on a differential signal between a sum of signals detected in the first region and the fourth region and a sum of signals detected in the second region and the third region.

Thus, the invention described herein makes possible the advantages of (1) providing an optical head device in which no focusing offset occurs even in the case where the wavelength of a light beam and/or the focal length of a lens deviates from its design value; (2) providing an optical head device having a focus error signal characteristics profile with good symmetry; and (3) providing an optical head device in which the focus error signal more quickly converges to zero as the displacement of the optical disk from a focused position increases (in other words, the profile of the focus error signal FE characteristics does not spread out on both sides).

These and other advantages of the present invention will become apparent to those skilled in the art upon reading and understanding the following detailed description with reference to the accompanying figures.

BRIEF DESCRIPTION OF THE DRAWINGS

FIG. 4 is a schematic diagram illustrating patterns of the PA hologram 181.

FIGS. 8A, 8B, and 8C are schematic diagrams illustrating the light-sensitive surface 193a' of the light detector 193.

FIGS. 9A, 9B, and 9C are schematic diagrams illustrating a light-sensitive surface 193a" of the light detector 193.

FIG. 12 is a schematic diagram illustrating patterns of a PA hologram 182.

FIG. 19 is a schematic diagram illustrating patterns of a PA hologram 180.

DESCRIPTION OF THE PREFERRED EMBODIMENTS

Hereinafter, the present invention will be described by way of examples, with reference to the accompanying figures.

EXAMPLE 1

Figure 1:
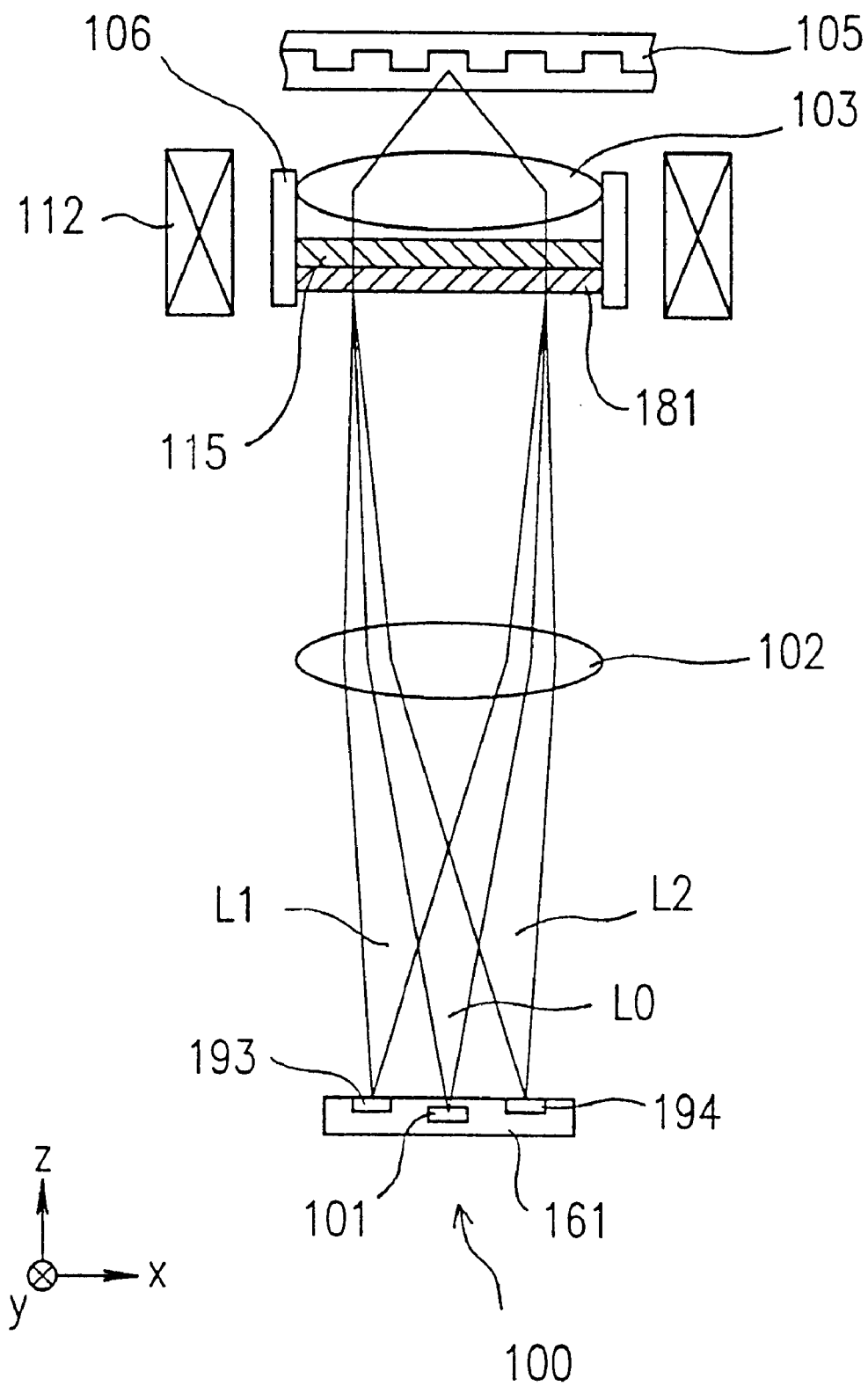
FIG. 1 is a schematic view illustrating the structure of an optical head device 100 according to Example 1 of the present invention.

FIG. 1 illustrates the structure of an optical head device 100 according to Example 1 of the present invention. The optical head device 100 records information on an information medium 105 or reproduces or erases information which has been recorded on the information medium 105. The information medium 105 is, for example, an optical disk or an optical card. The information medium 105 can be a single-layer optical disk such as a CD, or a double-layer optical disk such as a DVD.

The optical head device 100 includes a LD-PD unit 161, a collimate lens 102, a PA hologram 181, a ¼ wavelength plate 115, and an object lens 103.

The LD-PD unit 161 includes a light source 101 for emitting a light beam L0, a light detector 193 for receiving a light beam L1 reflected from the information medium 105, and a light detector 194 for receiving a light beam L2 reflected from the information medium 105. The light source 101 and the light detectors 193 and 194 take specific relative positions with respect to one another in the LD-PD unit 161, as described later with reference to FIG. 2.

The optical head device 100 further includes a support member 106 for supporting the PA hologram 181, ¼ wavelength plate 115, and the object lens 103, as well as a driving section 112 for driving the support member 106 along the z-axis direction.

The information medium 105 is positioned so that the tangential direction thereof substantially coincides with the y-axis direction. Herein, the tangential direction of the information medium 105 is defined as the direction along which pit arrays are formed on the information medium 105 or the direction along which grooves are formed on the information medium 105.

Hereinafter, the operation of the optical head device 100 will be described.

The light source 101 emits the linear polarization light beam L0, which is polarized along the x-axis direction. The light beam L0 emitted from the light source 101 is converted into collimated light through the collimate lens 102. Thereafter, the light beam L0 is transmitted through the PA hologram 181 without being refracted by the PA hologram 181. The polarization state of the light beam L0 is changed from linear polarization into circular polarization through the ¼ wavelength plate 115. The light beam L0 is focused on the information medium 105 through the object lens 103.

The light beam reflected from the information medium 105 travels in the opposite direction from the direction of travel of the light beam L0 emitted from the light source 101, so as to travel back through the ¼ wavelength plate 115. The polarization state of this light beam is changed from circular polarization into linear polarization through the ¼ wavelength plate 115. The polarization direction of the linear polarization light is a direction (i.e., the y-axis direction) which is perpendicular to the polarization direction of the light beam L0 emitted from the light source 101. The light beam which has been transmitted through the ¼ wavelength plate 115 is split by the PA hologram 181 into +1st diffracted light L1 and −1st diffracted light L2. The +1st diffracted light L1 enters the light detector 193. The −1st diffracted light L2 enters the light detector 194. The light detectors 193 and 194 detect servo signals and/or a signal representing the information recorded on the information medium 105.

Figure 2:
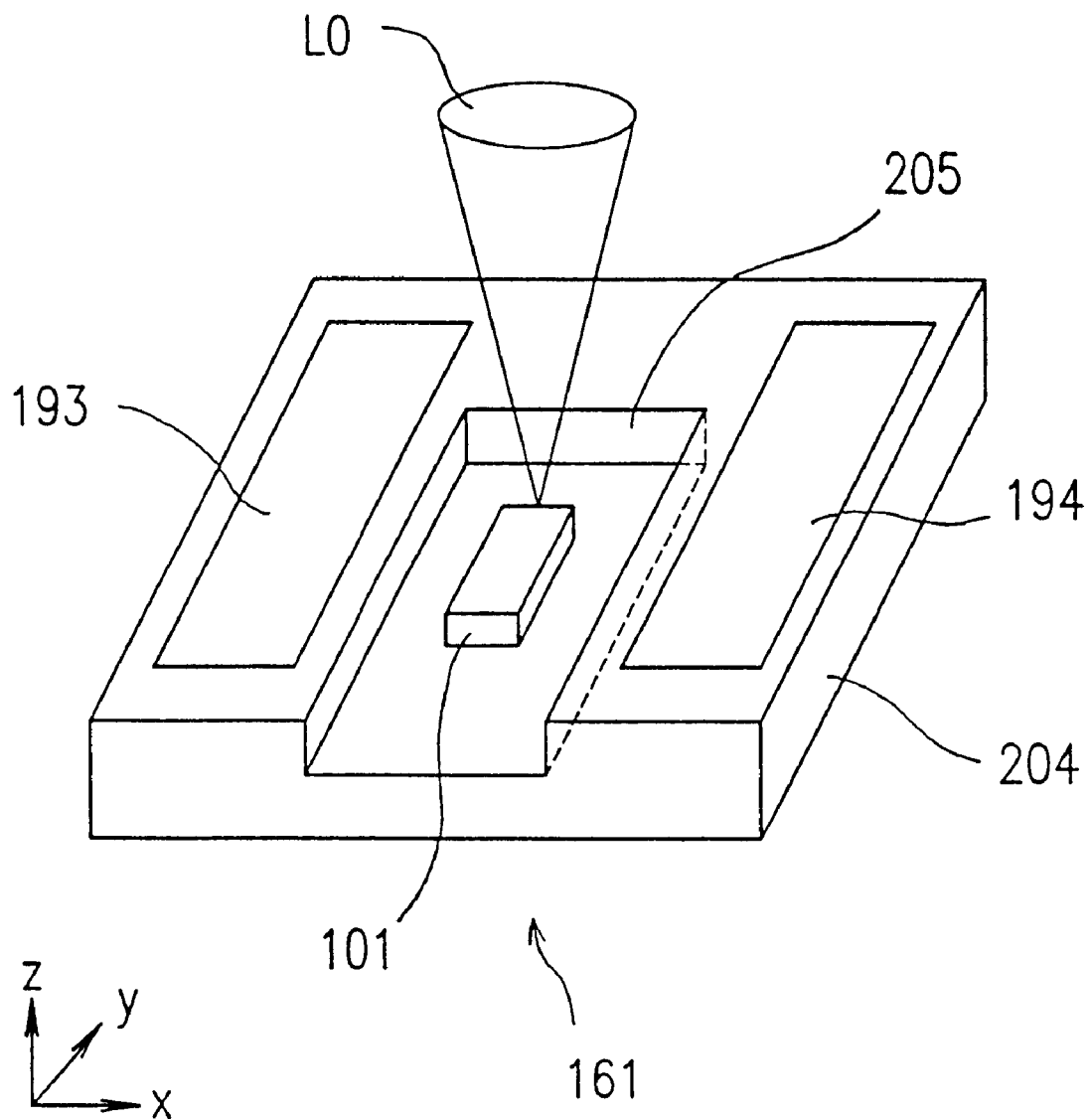
FIG. 2 is a schematic view illustrating the structure of a LD-PD unit 161.

FIG. 2 illustrates the structure of the LD-PD unit 161. As shown in FIG. 2, the light source 101 is affixed on a silicon substrate 204. The light source can be a semiconductor laser, for example. The light detectors 193 and 194 are formed on the surface of the silicon substrate 204. The light beam L0 emitted from the light source 101 is reflected by an etching mirror 205 formed on the silicon substrate 204 so as to be deflected in a direction perpendicular to the silicon substrate 204.

The relative positions of the light source 101 and the light detectors 193 and 194 are stable against the influences of changes in temperature, vibration, and the like because the light source 101 is directly affixed on the silicon substrate 204, on which the light detectors 193 and 194 are formed. Furthermore, the light source 101 can be highly accurately affixed on the silicon substrate 204 because the light source 101 is mounted on the surface of the silicon substrate 204. Thus, the LD-PD unit 161 has a structure which is suitable for mass production.

Figure 3:
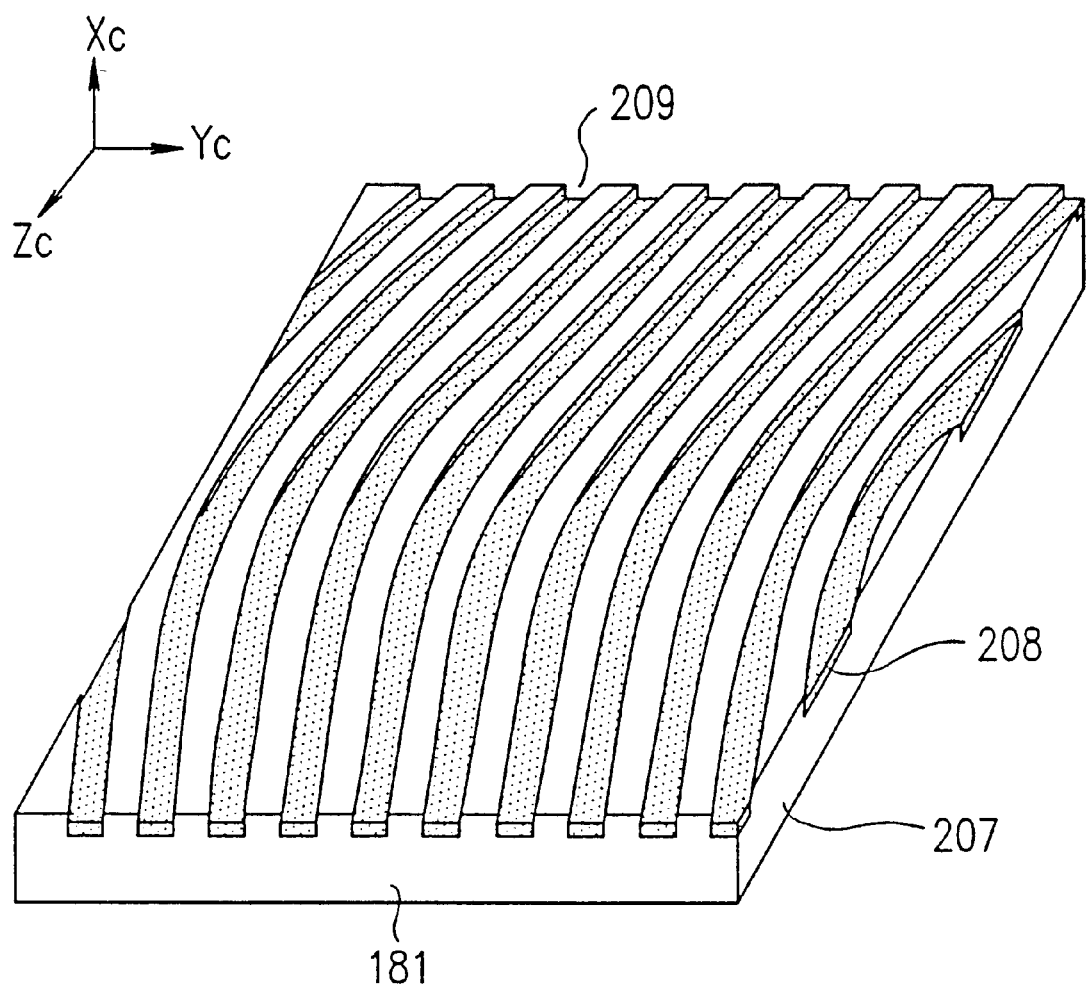
FIG. 3 is a schematic view illustrating the structure of a PA hologram 181.

FIG. 3 illustrates the structure of the PA hologram 181. The PA hologram 181 functions so as to transmit light which has been polarized in a specific direction, while diffracting light which has been polarized in a direction perpendicular to the specific direction. In FIG. 3, Xc, Yc, and Zc represent three axes of the crystal.

As shown in FIG. 3, proton exchange regions 208 are periodically formed on a lithium niobate substrate 207 on the x face. Grooves 209 are formed by selectively etching the proton exchange regions 208.

Hereinafter, the operation of the PA hologram 181 will be described.

In the case where normal light enters the PA hologram 181, the refractive index in the proton exchange regions 208 decreases by 0.04. As a result, the phase of the normal light is advanced as the normal light is transmitted through the proton exchange regions 208. The phase of the normal light is further advanced as the normal light is transmitted through the grooves 209.

In the case where abnormal light enters the PA hologram 181, the refractive index in the proton exchange regions 208 increases by 0.145. As a result, the phase of the abnormal light is delayed as the abnormal light is transmitted through the proton exchange regions 208, but the phase of the abnormal light is advanced as the abnormal light is transmitted through the grooves 209. Thus, the delay in the phase of the abnormal light due to the proton exchange regions 208 is cancelled by the advancement in the phase of the abnormal light due to the grooves 209.

By optimizing the depth of the proton exchange regions 208 and the depth of the grooves 209, it becomes possible to attain a polarization splitter function for diffracting normal light while not diffracting abnormal light. In an exemplary case where the wavelength of the light entering the PA hologram 181 is 0.78 μm, the depth da of the grooves 209 can be prescribed at 0.25 μm and the depth dp of the proton exchange regions 208 at 2.22 μm in order to attain a polarization splitter function. The grooves 209 may be divided into subregions as desired. The grooves 209 may have a predetermined pattern. The wave front of the diffracted light may be processed as desired.

Hereinafter, the details of the signal detection process will be described with reference to FIGS. 4 and 5.

FIG. 4 schematically illustrates patterns of the PA hologram 181. The PA hologram 181 is divided into four regions (regions A, B, C, and D) by a line which intersects the center of the PA hologram 181 and extends in parallel to the x axis and a line which intersects the center of the PA hologram 181 and extends in parallel to the y axis.

More specifically, assuming that the original point of the x, y, z axes is the center of the PA hologram 181, a region where x>0 and y>0 is defined as region A;

a region where x>0 and y<0 is defined as region B;

a region where x<0 and y<0 is defined as region C; and a region where x<0 and y>0 is defined as region D.

Herein, the center of the PA hologram 181 coincides with its optic axis.

Each of regions A, B, C, and D is subdivided into a plurality of strip regions by a plurality of lines extending in parallel to the y axis. For example, regions Ab and regions Af alternate in region A; regions Bb and regions Bf alternate in region B; regions Cb and regions Cf alternate in region C; and regions Db and regions Df alternate in region D.

In FIG. 4, regions which are indicated by the same region name have a hologram pattern generated from the same function; regions which are indicated by different region names have hologram patterns generated from different functions. As a result, regions indicated by different region names diffract light beams in different directions or wave fronts.

Figure 5:
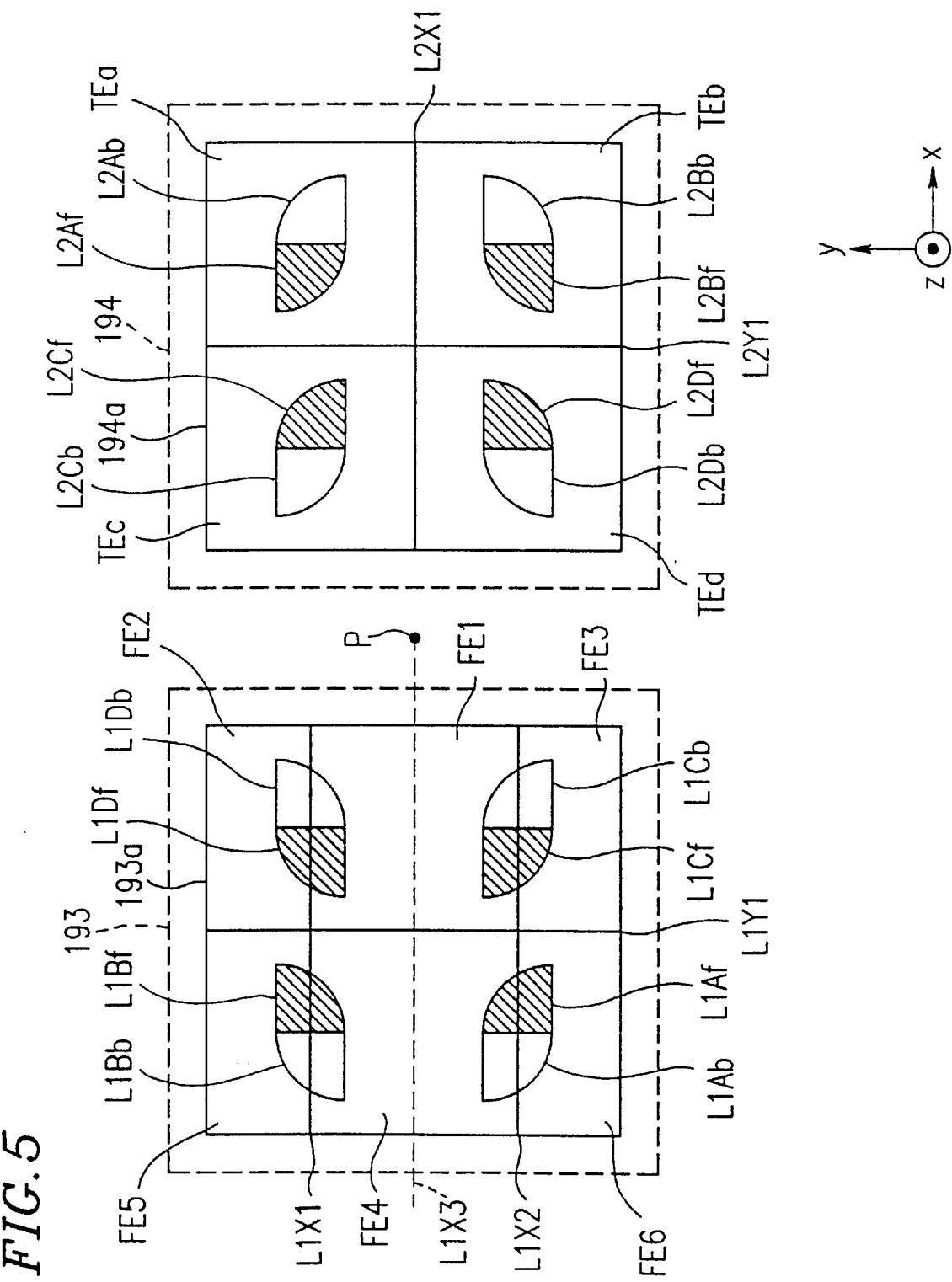
FIG. 5 is a schematic diagram illustrating a light-sensitive surface 193a of a light detector 193 and a light-sensitive surface 194a of a light detector 194.

FIG. 5 illustrates a light-sensitive surface 193a of the light detector 193 and a light-sensitive surface 194a of the light detector 194 provided in the LD-PD unit 161.

The light-sensitive surfaces 193a and 194a are disposed in a symmetrical manner with respect to an emission point (i.e., a point from which the light beam L0 is emitted) or a point equivalent to the emission point. In FIG. 5, point P represents the emission point or a point equivalent to the emission point.

The light-sensitive surface 193a is divided into six regions (regions FE1, FE2, FE3, FE4, FE5, and FE6) by two lines L1X1 and L1X2 extending in parallel to the x axis and a line L1Y1 extending in parallel to the y axis.

The light-sensitive surface 194a is divided into four regions (regions TEa, TEb, TEc, and TEd) by a line L2X1 extending in parallel to the x axis and a line L2Y1 extending in parallel to the y axis.

Due to the diffraction action of the PA hologram 181, the light beam reflected from the information medium 105 is converted into the +1st diffracted light L1 and the −1st diffracted light L2. The +1st diffracted light L1 enters the light-sensitive surface 193a, whereas the −1st diffracted light L2 enters the light-sensitive surface 194a.

Light spots are created on the light-sensitive surface 193a corresponding to the light beams entering the respective regions of the PA hologram 181. The light spots L1Ab, L1Af, L1Bb, L1Bf, L1Cb, L1Cf, L1Db, and L1Df are formed by light beams entering regions Ab, Af, Bb, Bf, Cb, Cf, Db, and Df, respectively, of the PA hologram 181.

Light spots are created on the light-sensitive surface 194a corresponding to the light beams entering the respective regions of the PA hologram 181. The light spots L2Ab, L2Af, L2Bb, L2Bf, L2Cb, L2Cf, L2Db, and L2Df are formed by light beams entering regions Ab, Af, Bb, Bf, Cb, Cf, Db, and Df, respectively, of the PA hologram 181.

The PA hologram 181 is designed so as to satisfy the following conditions (1) to (4) in a focused state (i.e., the size of the light spot converged on the recording face of information medium 105 becomes minimum):

(1) A light beam entering region Ab (FIG. 4) is converged at a point behind the light-sensitive surface 193a, whereas a light beam entering region Af (FIG. 4) is converged at a point in front of the light-sensitive surface 193a. The light spots L1Ab and L1Af are formed astride regions FE4 and FE6 of the light-sensitive surface 193a.

(2) A light beam entering region Bb (FIG. 4) is converged at a point behind the light-sensitive surface 193a, whereas a light beam entering region Bf (FIG. 4) is converged at a point in front of the light-sensitive surface 193a. The light spots L1Bb and L1Bf are formed astride regions FE4 and FE5 of the light-sensitive surface 193a.

(3) A light beam entering region Cb (FIG. 4) is converged at a point behind the light-sensitive surface 193a, whereas a light beam entering region Cf (FIG. 4) is converged at a point in front of the light-sensitive surface 193a. The light spots L1Cb and L1Cf are formed astride regions FE1 and FE3 of the light-sensitive surface 193a.

(4) A light beam entering region Db (FIG. 4) is converged at a point behind the light-sensitive surface 193a, whereas a light beam entering region Df (FIG. 4) is converged at a point in front of the light-sensitive surface 193a. The light spots L1Db and L1Df are formed astride regions FE1 and FE2 of the light-sensitive surface 193a.

In this specification, a "point behind a light-sensitive surface" is defined as a point whose z coordinate value is smaller than the z coordinate value of the light-sensitive surface, whereas a "point in front of a light-sensitive surface" is defined as a point whose z coordinate value is larger than the z coordinate value of the light-sensitive surface.

The light detector 193 generates a focus error signal FE in accordance with equation 3 below.

$$FE=(S_{FE1}+S_{FE5}+S_{FE6})-(S_{FE2}+S_{FE3}+S_{FE4}) \quad \text{eq. 3}$$

where $S_{FE1}$ to $S_{FE6}$ represent the respective signals detected in regions FE1 to FE6 of the light-sensitive surface 193a.

The light detector 194 generates a tracking error signal TE. The tracking error signal TE can be generated in either a push-pull method or a phase difference method, depending on the type of the information medium 105. The push-pull method is employed in the case where the information medium 105 is an optical disk having continuous grooves (e.g., a read/write optical disk). The phase difference method is employed in the case where the information medium 105 is an optical disk carrying track information in the form of pits (e.g., a ROM optical disk).

In the case where the push-pull method is employed, the tracking error signal TE is generated in accordance with equation 4 below:

$$TE=(S_{TEa}+S_{TEb})-(S_{TEc}+S_{TEd}) \quad \text{eq. 4}$$

where $S_{TEa}$ to $S_{TEd}$ represent the respective signals detected in regions TEa to TEd of the light-sensitive surface 194a.

In the case where the phase difference method is employed, the tracking error signal TE is generated based on a comparison between the phase of the sum signal $(S_{TEa}+S_{TEc})$ and the phase of the sum signal $(S_{TEb}+S_{TEd})$.

A signal representing the information recorded on the information medium 105 can be obtained by summing up all the signals detected in the respective regions of the light-sensitive surface 193a of the light detector 193. Alternatively, such an information signal can be obtained by summing up all the signals detected in the respective regions of the light-sensitive surface 194a of the light detector 194.

Alternatively, such an information signal can be obtained by summing up all the signals detected in the respective regions of the light-sensitive surface 193a of the light detector 193 and all the signals detected in the respective regions of the light-sensitive surface 194a of the light detector 194.

The optical head device 100 according to the present invention prevents a focusing offset from occurring even in the case where the wavelength of a light beam deviates from its design value. The reasons thereof are described below.

If the wavelength of a light beam deviates from its design value, the angle of the light beam diffracted by the PA hologram 181 also deviates, so that the position of the light spot formed on the light-sensitive surface 193a of the light detector 193 deviates from its design value.

However, in accordance with the optical head device 100, the focus error signal FE generated in accordance with eq. 3 is maintained at zero even if the position of the light spot formed on the light-sensitive surface 193a of the light detector 193 deviates from its design value.

For example, if the actual wavelength of a light beam is longer than its design value, the light spots L1Bb, L1Bf, L1Db, and L1Df shift in the minus direction on the x axis and in the plus direction on the y axis, whereas the light spots L1Ab, L1Af, L1Cb, and L1Cf shift in the minus direction the x axis and in the minus direction on the y axis, The shifts of the light spots along the x axis become negligible by designing the light detector 193 so as to have a sufficiently large width along the x axis. Therefore, in practice, only the shifts of the light spots along the y axis need consideration.

Shifts of light spots along the y axis result in a decrease in the levels of the signals $S_{FE1}$ and $S_{FE4}$. However, such a decrease in the signals is cancelled at the time of generating the focus error signal FE in accordance with eq. 3. Shifts of light spots along the y axis also result in an increase in the levels of the signal $S_{FE2}$, signal $S_{FE3}$, signal $SF_{FE5}$, and signal $S_{FE6}$. However, such an increase in the signals is cancelled at the time of generating the focus error signal FE in accordance with eq. 3. As a result, no focusing offset occurs due to shifts of the light spots along the y axis.

Hereinafter, the principles under the present invention for generating the focus error signal FE free of a focusing offset will be described in more detail with reference to FIGS. 6 to 9.

Figure 6:
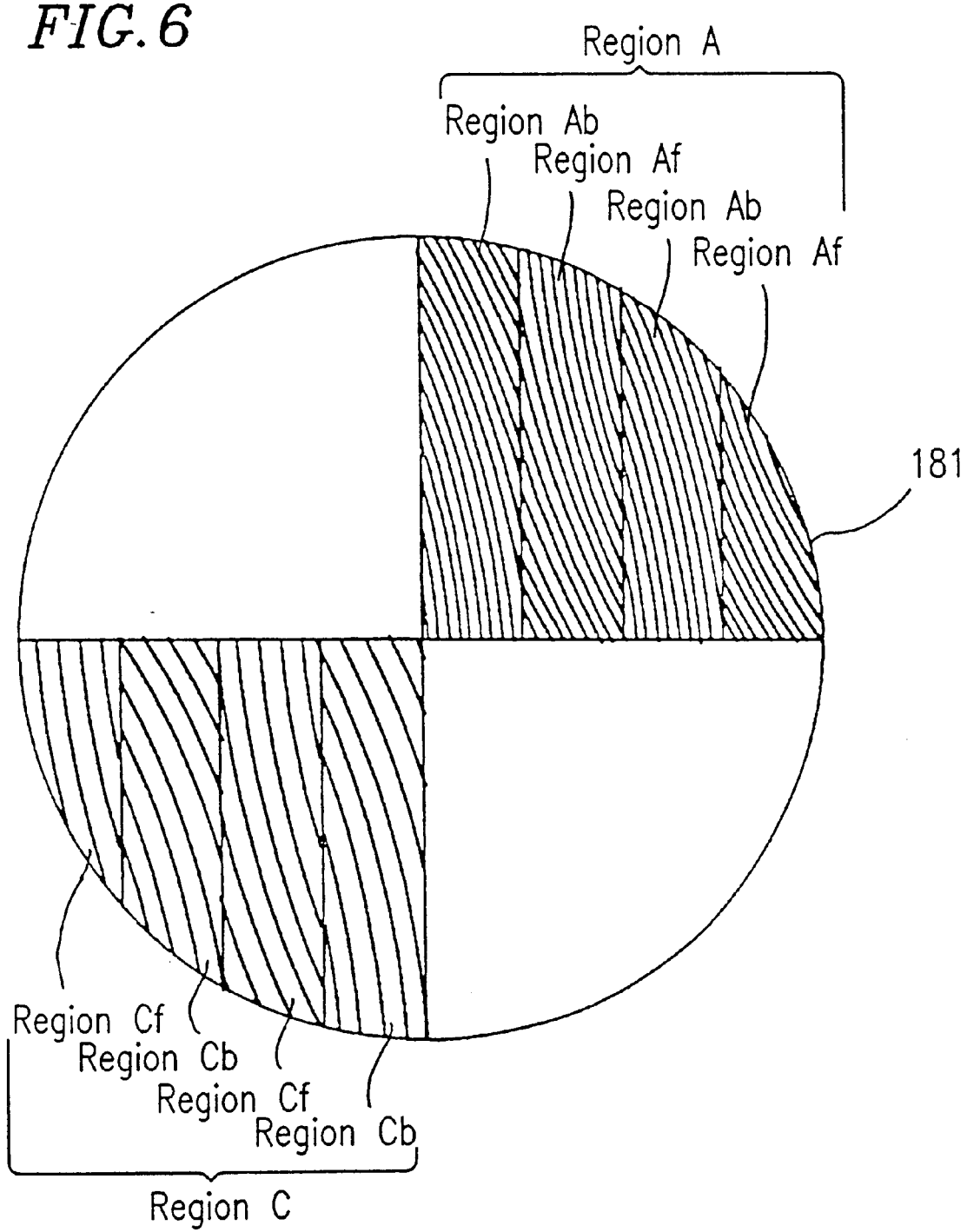
FIG. 6 is a schematic diagram illustrating patterns of the PA hologram 181.

FIG. 6 schematically illustrates patterns of the PA hologram 181. For conciseness, FIG. 6 only illustrates regions A and C, among all the patterns of the PA hologram 181 shown in FIG. 4.

Each of regions A and C is subdivided into a plurality of strip regions by a plurality of lines extending in parallel to the y axis. Specifically, region A is subdivided into alternating regions Ab and regions Af. Region C is subdivided into alternating regions Cb and regions Cf.

Figure 7A:
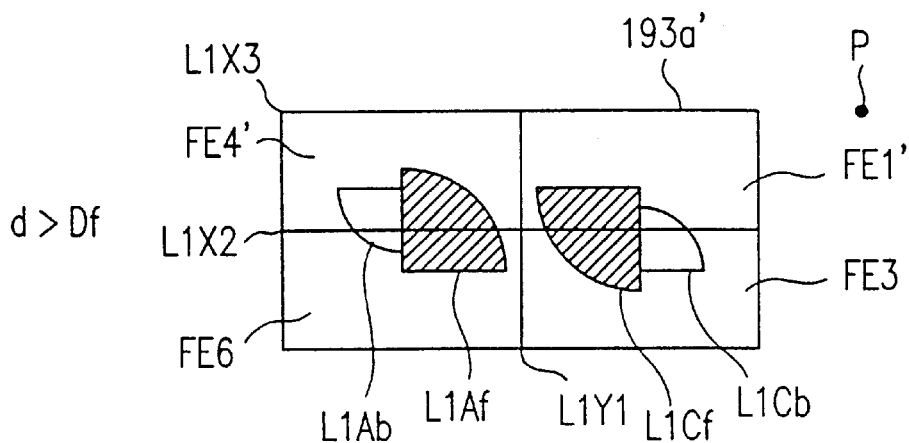
FIGS. 7A, 7B, and 7C are schematic diagrams illustrating a light-sensitive surface 193a' of the light detector 193.
Figure 7B:
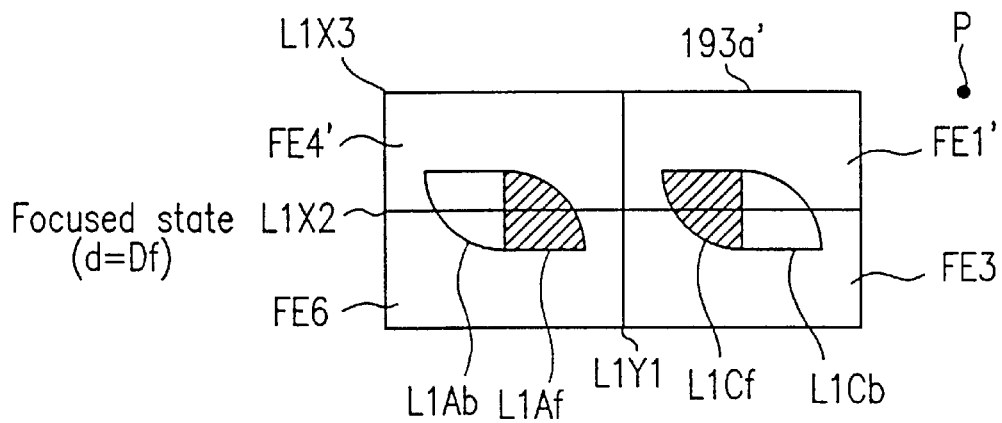
Figure 7C:
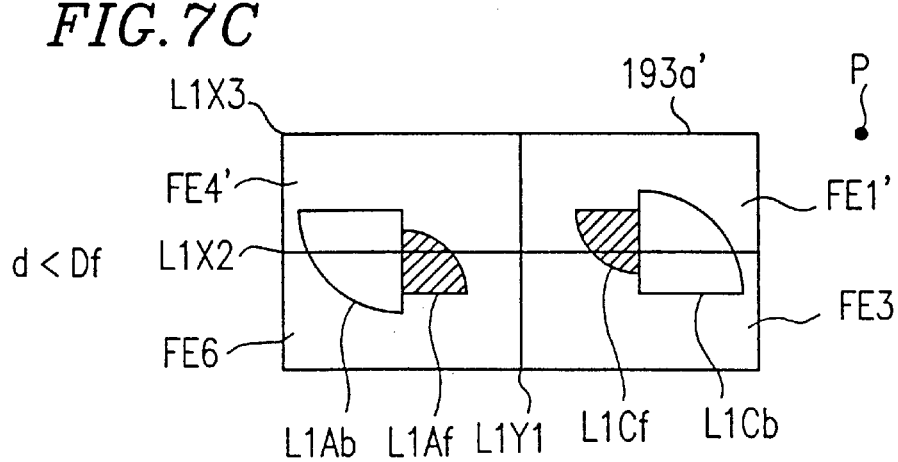

FIGS. 7A, 7B, and 7C are schematic diagrams illustrating the generation of the focus error signal FE. In FIGS. 7A, 7B, and 7C, reference numeral 193a' denotes a lower half (i.e., the half under a dotted line L1X3 in FIG. 5 extending in parallel to the x axis) of the light-sensitive surface 193a of the light detector 193 in FIG. 5.

The light-sensitive surface 193a' is divided into four regions (regions FE1', FE3, FE4', and FE6) by the line L1X2 extending in parallel to the x axis and the line L1Y1 extending in parallel to the y axis.

Each of the regions FE1', FE3, FE4', and FE6 generates a detection signal in accordance with the light amount of the respective incident light beam. In other words, regions FE1', FE3, FE4', and FE6 function as photodetectors. Regions FE1' nand FE3 are defined as a first pair of photodetectors. Regions FE4' and FE6 are defined as a second pair of photodetectors.

The first pair of photodetectors and the second pair of photodetectors are located along a direction (i.e., the x-axis direction) which is substantially perpendicular to the tangential direction of the information medium 105.

The focus error signal FE is generated by summing a differential signal generated by the first pair of photodetectors ($S_{FE1'}-S_{FE3}$) and a differential signal generated by the second pair of photodetectors ($S_{FE6}-S_{FE4'}$). In other words, the focus error signal FE can be expressed by equation 5 below:

$$FE=(S_{FE1'}-S_{FE3})+(S_{FE6}-S_{FE4'}) \quad \text{eq. 5}$$

where $S_{FE1'}$, $S_{FE3}$, $S_{FE4'}$, and $S_{FE6}$ represent the respective signals detected in regions FE1', FE3, FE4' and FE6 of the light-sensitive surface 193a'.

FIG. 7B illustrates the shapes and positions of the light spots L1Ab, L1Af, L1Cb, and L1Cf created on the light-sensitive surface 193a' in a focused state.

In a focused state, the radius of the light spot L1Cb and the radius of the light spot L1Cf become equal so that the light beam incident on region FE1' and the light beam incident on region FE3 have the same light amount. Thus, the differential signal generated by the first pair of photodetectors ($S_{FE1'}-S_{FE3}$) becomes zero.

In a focused state, the radius of the light spot L1Ab and the radius of the light spot L1Af become equal so that the light beam incident on region FE4' and the light beam incident on region FE6 have the same light amount. Thus, the differential signal generated by the second pair of photodetectors ($S_{FE6}-S_{FE4'}$) becomes zero.

Therefore, FE=0 in a focused state (see eq. 5).

Next, the cases other than the focused state will be considered. In the following discussion, a focused state is expressed as d=Df, where Df represents the distance between the optical head device 100 and the information medium 105 in a focused state, and d represents the actual distance between the optical head device 100 and the information medium 105.

FIG. 7A illustrates the shapes and positions of the light spots L1Ab, L1Af, L1Cb, and L1Cf created on the light-sensitive surface 193a' in the case where the information medium 105 is displaced farther away from the optical head device 100 than in a focused state (i.e., d>Df). In this case, the light beams incident on the respective regions of the PA hologram 181 are converged at points in front of the light-sensitive surface 193a' (as compared to the light spots converged in a focused state). As a result, the radii of the light spots L1Ab and L1Cb decrease, whereas the radii of the light spots L1Af and L1Cf increase.

In the case where d>Df, the light amount of the light beam entering region FE1' decreases, whereas the light amount of the light beam entering region FE3 increases. As a result, the differential signal ($S_{FE1'}-S_{FE3}$) generated by the first pair of photodetectors is reduced in level as compared to the value attained in a focused state, that is, ($S_{FE1'}-S_{FE3}$)<0.

In the case where d>Df, the light amount of the light beam entering region FE6 decreases, whereas the light amount of the light beam entering region FE4' increases. As a result, the differential signal ($S_{FE6}-S_{FE4'}$) generated by the second pair of photodetectors is reduced in level as compared to the value attained in a focused state, that is, ($S_{FE6}-S_{FE4'}$)<0.

Therefore, FE<0 where d>Df (see eq. 5).

FIG. 7C illustrates the shapes and positions of the light spots L1Ab, L1Af, L1Cb, and L1Cf created on the light-sensitive surface 193a' in the case where the information medium 105 is displaced closer toward the optical head device 100 than in a focused state (i.e., d<Df). In this case, the light beams incident on the respective regions of the PA hologram 181 are converged at points behind the light-sensitive surface 193a' (as compared to the light spots converged in a focused state). As a result, the radii of the light spots L1Af and L1Cf decrease, whereas the radii of the light spots L1Ab and L1Cb increase.

In the case where d<Df, the light amount of the light beam entering region FE1' increases, whereas the light amount of the light beam entering region FE3 decreases. As a result, the differential signal ($S_{FE1'}-S_{FE3}$) generated by the first pair of photodetectors is increased in level as compared to the value attained in a focused state, that is, ($S_{FE1'}-S_{FE3}$)>0.

In the case where d<Df, the light amount of the light beam entering region FE6 increases, whereas the light amount of the light beam entering region FE4' decreases. As a result, the differential signal ($S_{FE6}-S_{FE4'}$) generated by the second pair of photodetectors is increased in level as compared to the value attained in a focused state, that is, ($S_{FE6}-S_{FE4'}$)≥0.

Therefore, FE>0 where d<Df (see eq. 5).

As described above, based on the sign (i.e., positive or negative) of the value of the focus error signal FE, it can be detected whether the information medium 105 is displaced farther away from or closer toward the optical head device 100 than in a focused state.

The optical head device 100 according to the present invention is arranged so that no focusing offset occurs even if the wavelength of a light beam deviates from its design value. In the following discussion, it is assumed that the wavelength of the incident light beam has a design value of λd and an actual value of λ.

FIG. 8B illustrates the shapes and positions of the light spots L1Ab, L1Af, L1Cb, and L1Cf created on the light-sensitive surface 193a' in a focused state, in the case where the wavelength of the light beam equals its design value (i.e., λ=λd). The shapes and the positions of the light spots shown in FIG. 8B are identical with those shown in FIG. 7B.

FIG. 8A illustrates the shapes and positions of the light spots L1Ab, L1Af, L1Cb, and L1Cf created on the light-sensitive surface 193a' in a focused state, in the case where the wavelength of the light beam is longer than its design value (i.e., λ>λd). In this case, the angles of diffraction applied to the light beam by the PA hologram 181 increase, so that each of the light spots L1Ab, L1Af, L1Cb, and L1Cf shifts in the minus direction on the x axis and in the minus direction of the y axis.

A shift of the light spot along the x axis does not affect the focus error signal FE because such a shift does not affect the differential signals generated by the first and second pairs of photodetectors.

A shift of the light spot along the y axis affects the differential signals generated by the first and second pairs of photodetectors. However, such influence on the differential signal generated by the first pair of photodetectors is cancelled by the influence on the differential signal generated by the second pair of photodetectors. Specifically, if the differential signal generated by the first pair of photodetectors increases in level, the differential signal generated by the second pair of photodetectors has a decrease corresponding to the increase of the differential signal generated by the first pair of photodetectors. Conversely, if the differential signal generated by the first pair of photodetectors decreases in level, the differential signal generated by the second pair of photodetectors has an increase in level corresponding to the decrease of the differential signal generated by the first pair of photodetectors. As a result, a shift of the light spot along the y axis does not affect the focus error signal FE. This point will be described in more detail below.

A shift of the light spot in the minus direction on the y axis results in an increase in the light amount entering regions FE1' and FE4' and a decrease in the light amount entering regions FE3 and FE6.

The relationships expressed by equation 6 below hold because the magnitudes of shifts of the light spots L1Cb and L1Cf along the y axis are equal to the magnitudes of shifts of the light spots L1Ab and L1Af along the y axis:

$$\Delta S_{FE1'} = \Delta S_{FE6} \text{ and } \Delta S_{FE4'} = \Delta S_{FE3} \qquad \text{eq. 6}$$

where $\Delta S_{FE1'}$ represents a decrease in light amount in regions FE1'; $\Delta S_{FE4'}$ represents a decrease in light amount in regions FE4'; $\Delta S_{FE3}$ represents an increase in light amount in regions FE3; and $\Delta S_{FE6}$ represents an increase in light amount in regions FE6.

The relationships expressed by equation 7 below hold:

$$\Delta S_1 = \Delta S_{FE1'} + \Delta S_{FE3} \text{ and } \Delta S_2 = \Delta S_{FE6} + \Delta S_{FE4'} \qquad \text{eq. 7}$$

where $\Delta S_1$ represents a decrease in the level of the differential signal $(S_{FE1'} - S_{FE3})$ generated by the first pair of photodetectors; and $\Delta S_2$ represents a decrease in the level of the differential signal $(S_{FE6} - S_{FE4'})$ generated by the second pair of photodetectors.

Equations 6 and 7 indicate equation 8 below:

$$\Delta S_1 = \Delta S_2 \qquad \text{eq. 8}$$

From eq. 8, it can be seen that the focus error signal FE is maintained at zero in a focused state even if the wavelength of the light beam becomes longer than its design value.

FIG. 8C illustrates the shapes and positions of the light spots L1Ab, L1Af, L1Cb, and L1Cf created on the light-sensitive surface 193a' in a focused state, in the case where the wavelength of the light beam is shorter than its design value (i.e., $\lambda < \lambda d$). In this case, the angles of diffraction applied to the light beam by the PA hologram 181 decrease, so that each of the light spots L1Ab, L1Af, L1Cb, and L1Cf shifts in the plus direction on the x axis and in the plus direction of the y axis. Equation 8 also holds in this case by the same principles. Thus, the focus error signal FE is maintained at zero in a focused state even if the wavelength of the light beam becomes shorter than its design value.

As described above, the fluctuation in the differential signal $(S_{FE1'} - S_{FE3})$ generated by the first pair of photodetectors is cancelled by the fluctuation in the differential signal $(S_{FE6} - S_{FE4'})$ generated by the second pair of photodetectors. As a result, focusing offsets due to a deviation in the wavelength of the light beam can be prevented.

The above description in connection with the light-sensitive surface 193a' also applies to an upper half (i.e., the half above the dotted line L1X3 in FIG. 5 extending in parallel to the x axis) of the light-sensitive surface 193a of the light detector 193 in FIG. 5. The upper half of the light-sensitive surface 193a' is divided into four regions (regions FE1", FE2, FE4", and FE5) by the line L1X1 extending in parallel to the x axis and the line L1Y1 extending in parallel to the y axis. Thus, region FE1 is divided by the line L1X3 into regions FE1' and FE1", whereas region FE4 is divided by the line L1X3 into regions FE4' and FE4".

Each of the regions FE1", FE2, FE4", and FE5 generates a detection signal in accordance with the light amount of the respective incident light beam. In other words, regions FE1", FE2, FE4", and FE5 function as photodetectors. Regions FE1" and FE2 are defined as a third pair of photodetectors. Regions FE4" and FE5 are defined as a fourth pair of photodetectors.

By the same principles as those described above, the fluctuation in the differential signal $(S_{FE1"} - S_{FE2})$ generated by the third pair of photodetectors is cancelled by the fluctuation in the differential signal $(S_{FE5} - S_{FE4"})$ generated by the fourth pair of photodetectors.

Equation 3 can be modified into equation 9 as follows:

$$\begin{aligned}FE &= (S_{FE1} + S_{FE5} + S_{FE6}) - (S_{FE2} + S_{FE3} + S_{FE4}) \qquad \text{eq. 9}\\ &= \{(S_{FE1'} + S_{FE1"}) + S_{FE5} + S_{FE6}\} - \\ &\quad \{S_{FE2} + S_{FE3} + (S_{FE4'} + S_{FE4"})\}\\ &= (S_{FE1'} - S_{FE3}) + (S_{FE6} - S_{FE4'}) + \\ &\quad (S_{FE1"} - S_{FE2}) + (S_{FE5} - S_{FE4"})\end{aligned}$$

Equation 9 indicates that the focus error signal FE defined by eq. 3 is obtained by summing the differential signal $(S_{FE1'} - S_{FE3})$ generated by the first pair of photodetectors, the differential signal $(S_{FE6} - S_{FE4'})$ generated by the second pair of photodetectors, the differential signal $(S_{FE1"} - S_{FE2})$ generated by the third pair of photodetectors, and the differential signal $(S_{FE5} - S_{FE4"})$ generated by the fourth pair of photodetectors.

The number of pairs of photodectors is not limited to 2 or 4. The present invention is applicable to a number N of pairs of photodetectors, where N is an integer which is equal to or greater than 2.

As described above, the focus error signal FE is obtained by summing up all the differential signals generated by a plurality of pairs of photodetectors. As such, any fluctuation in at least one of the plurality of pairs of photodetectors is cancelled by the fluctuation in at least another pair of photodectors.

In the example illustrated in FIGS. 8A, 8B, and 8C, regions FE1' and FE3 (corresponding to a first pair of photodetectors) and regions FE4' and FE6 (corresponding to a second pair of photodetectors) are arranged along the x-axis direction. However, these regions can be arranged along a direction other than the x-axis direction; they can alternatively be arranged along the y-axis direction.

FIGS. 9A, 9B, and 9C illustrate a light-sensitive surface 193a" in which regions FE1' and FE3 and regions FE4' and FE6 are arranged along the y-axis direction.

In the case where regions FE1' and FE3 and regions FE4' and FE6 are arranged along the y-axis direction as shown in FIGS. 9A, 9B, and 9C, the fluctuation in the differential signal $(S_{FE1'} - S_{FE3})$ generated by the first pair of photodetectors is not completely cancelled by the fluctuation in the differential signal $(S_{FE6} - S_{FE4'})$ generated by the second pair of photodetectors because the magnitudes of shifts of the light spots L1Ab and L1Af along the y axis are not equal to the magnitudes of shifts of the light spots L1Cb and L1Cf along the y axis.

Nonetheless, the fluctuation in the differential signal $(S_{FE1'} - S_{FE3})$ generated by the first pair of photodetectors is in the opposite direction from the fluctuation in the differential signal $(S_{FE6} - S_{FE4'})$ generated by the second pair of photodetectors, under the same principles described with reference to FIGS. 8A to 8C. As a result, the fluctuation in the differential signal $(S_{FE1'} - S_{FE3})$ generated by the first pair of photodetectors is substantially reduced, if not completely cancelled, by the fluctuation in the differential signal $(S_{FE6} - S_{FE4'})$ generated by the second pair of photodetectors.

As described above, according to the present invention, no focusing offset occurs even if the wavelength of a light beam deviates from its design value. Furthermore, an optical information apparatus can be produced by incorporating the optical head device 100. Such an optical information apparatus incorporating the optical head device 100 provides the advantage of excellent thermal stability.

In the present example, the focus error signal FE can be generated by utilizing substantially all of the light amount of the +1st diffracted light, and the tracking error signal TE can be generated by utilizing substantially all of the light amount of the −1st diffracted light. As a result, the focus error signal FE and the tracking error signal TE can be designed so as to have a high intensity. Thus, servo signals having a high S/N (signal-to-noise) ratio can be provided.

Furthermore, since the focus error signal FE can be generated by utilizing substantially all of the light amount of the +1st diffracted light, an advantage is provided in that the diffracted light for detecting the focus error signal has little variation in light amount along the y-axis direction (i.e., a direction perpendicular to the split line on the light detector), so that a focus error signal having a good linearity can be provided.

Furthermore, since the tracking error signal TE can be generated by utilizing substantially all of the light amount of the −1st diffracted light, an advantage is provided in that the stable signal detection can be attained in spite of possible scars on the information medium 105.

Thus, the present invention can provide an optical head device in which all of the problems associated with conventional optical head devices are solved.

The use of the LD-PD unit 161 provides an advantage in that a stable optical system can be produced at low cost. In general, an optical head device utilizing a holographic optical element can provide a stable operation by employing a unit in which LD function and PD functions are integrated because of the close relative positions and secure affixation of a semiconductor laser and light detectors, which prevent positional deviations due to thermal expansion, vibration, and the like. On the other hand, such units present high production costs because of the difficulty in obtaining a unit in which the relative positions of such elements are appropriately adjusted. In contrast, in accordance with the LD-PD unit 161, the light detectors 193 and 194 are formed on the same silicon substrate 204, thereby facilitating the fine adjustment of the relative positions of the light detectors 193 and 194 on the order of submicrons through IC (integrated circuit) production processes. Furthermore, the semiconductor laser 101 can be mounted on the surface of the substrate 204, thereby allowing for a uniaxial mounting scheme. This prevents errors associated with employing different work tools and provides for accurate mounting.

Since problems such as focusing offsets are solved in the LD-PD unit 161 according to the present invention, the use of such a LD-PD unit 161 makes it possible to provide a stable optical system at low cost. Furthermore, the present example of the invention provides a large tolerance with respect to errors in the positioning of the emission point of the semiconductor laser along the x-axis direction, as described above. Thus, an even more stable optical system can be provided at even lower cost.

Furthermore, according to the present example, the PA hologram 181 and the ¼ wavelength plate 115 are combined so as not to allow any unnecessary diffraction as the light is transmitted therethrough in the forward direction, while generating diffracted light for obtaining servo signals and the like from the light which is transmitted therethrough in the backward direction. Accordingly, a high efficiency of light utility and a high signal amplitude can be provided, as well as signals having a high S/N ratio free of noise due to unnecessary diffraction of light. In particular, the present example provides an outstanding effect in currently marketed DVDs and optical disks with even higher densities in that the diffraction efficiency in connection with unnecessary diffraction can be minimized toward zero so as to provide servo signals and/or information signals with a higher quality. Furthermore, the diffraction efficiency for the +1st and −1st diffracted light as the light is transmitted back through can be increased while reducing the diffraction efficiency (transmittance) for the 0th diffracted light. As a result, the generation of noise due to returned light can be prevented in the case of using a semiconductor laser as a light emission source.

Furthermore, according to the present example, the support member 106 serves to retain the predetermined relative positions of the PA hologram 181, the ¼ wavelength plate 115, and the object lens 103, so that the PA hologram 181 will move in an integral manner responsive to any movement of the object lens 103 during tracking control. Thus, the light beam reflected from the information medium 105 does not substantially move on the PA hologram 181. Accordingly, stable servo functions can be provided, substantially free of degradation in the signals obtained from the light detectors 193 and 194, in spite of such movement of the object lens 103.

The PA hologram 181 according to the present example has the structure as shown in FIG. 4, in which the PA hologram 181 is subdivided into a plurality of strip regions by lines extending in parallel to the y axis. This provides an advantage in that, since each region includes only one type of lattice, no unnecessary diffracted light is generated due to interference between lattices, thereby resulting in reduced stray light, reduced noise, and an improved light utility efficiency. Furthermore, these patterns are arranged so as to minimize the leak of the focus error signal into the tracking error signal. Specifically, a sufficient number of regions for focusing at a point behind the light detector 193 (i.e., Ab, Bb, Cb, and Db) and a sufficient number of regions for focusing at a point in front of the light detector 193 (i.e., Af, Bf, Cf, and Df) alternate, thereby ensuring that any imbalance associated with such subdivisions of regions will be alleviated.

Figure 10:
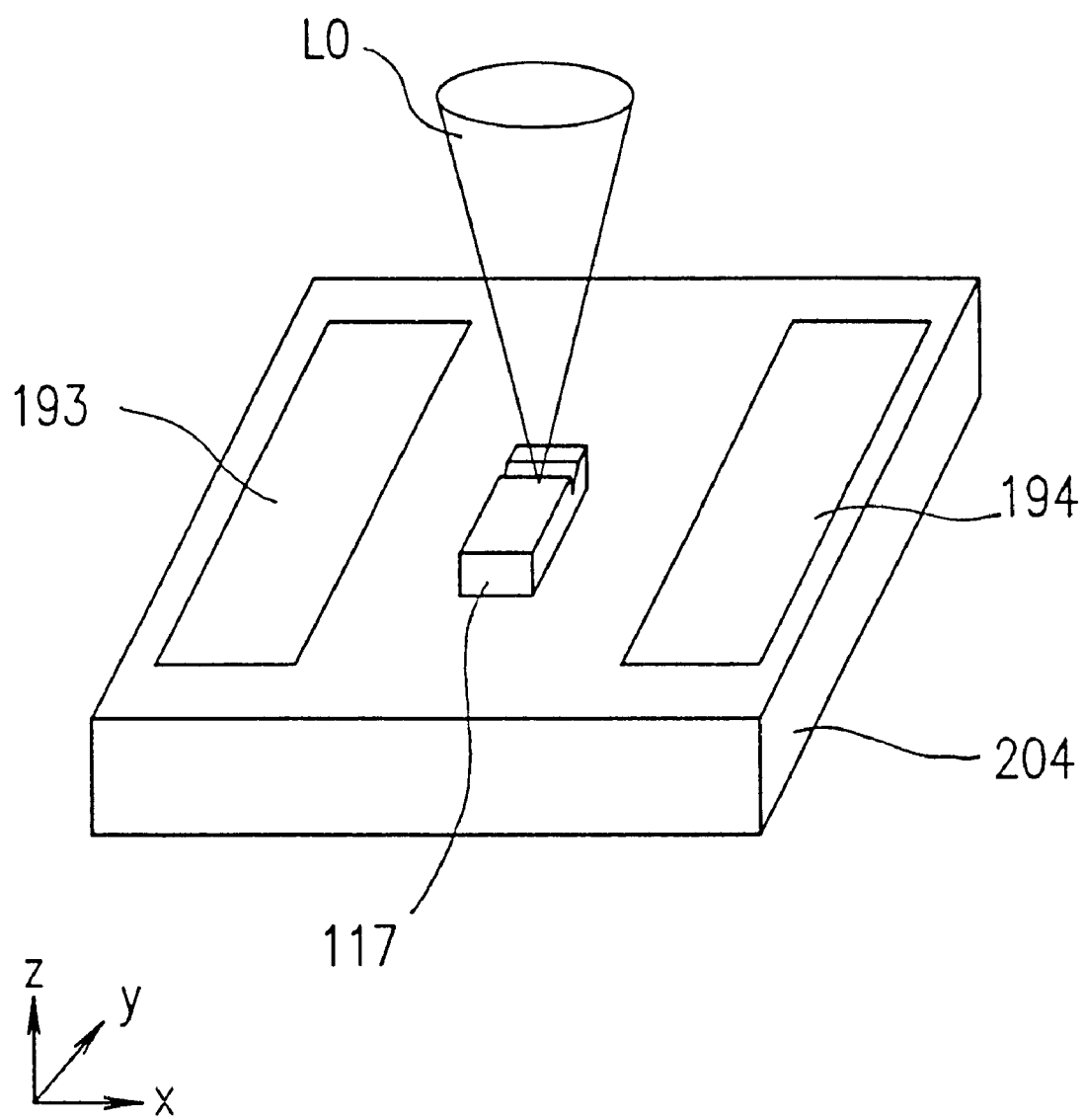
FIG. 10 is a schematic view illustrating the structure of a LD-PD unit.
Figure 11:
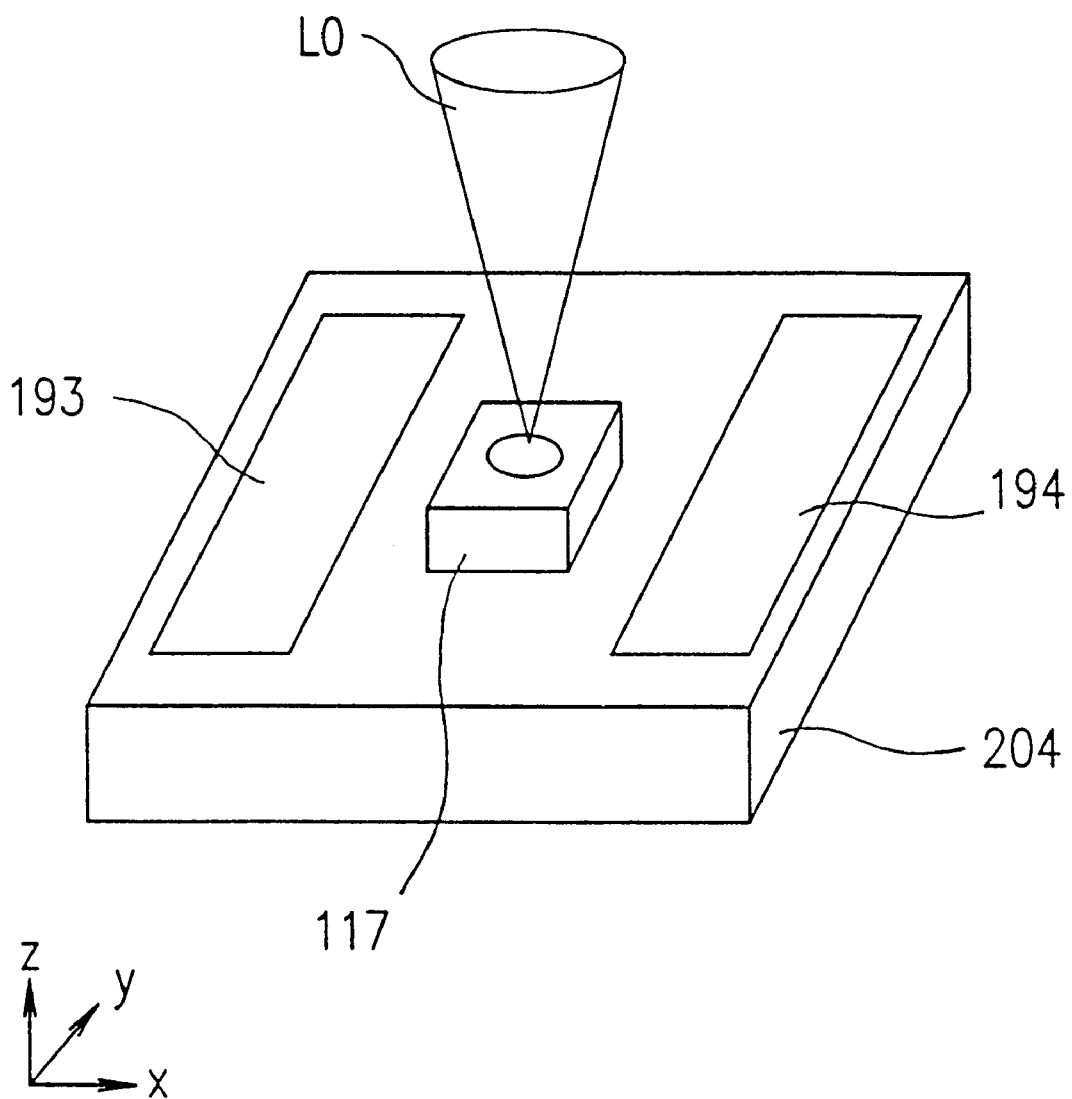
FIG. 11 is a schematic view illustrating the structure of a LD-PD unit.

Although the PA hologram 181 described in the present example has the structure shown in FIG. 3, the PA hologram 181 can have any structure as long as it provides different diffraction efficiencies for different polarization directions; for example, the PA hologram 181 can be a holographic optical element disclosed in Japanese Laid-Open Publication No. 63-314502, or a holographic optical element utilizing liquid crystal. Although the LD-PD unit 161 described in the present example has the structure shown in FIG. 4, the LD-PD unit 161 can have any structure in which a semiconductor laser and light detectors are integrally formed; for example, LD-PD units shown in FIGS. 10 and 11 can be alternatively used.

EXAMPLE 2

An optical head device according to Example 2 of the present invention is obtained by replacing the PA hologram 181 in Example 1 with a PA hologram 182.

FIG. 12 schematically illustrates patterns of the PA hologram 182. The PA hologram 182 is divided into four regions (regions A, B, C, and D) by a line which intersects the center of the PA hologram 182 and extends in parallel to the x axis and a line which intersects the center of the PA hologram 182 and extends in parallel to the y axis. Herein, the center of the PA hologram 182 coincides with its optic axis.

Due to the diffraction action of the PA hologram 182, the light beam reflected from the information medium 105 (FIG. 1) is converted into +1st diffracted light L1 and −1st diffracted light L2. The +1st diffracted light L1 enters a light-sensitive surface 193a (FIG. 5), whereas the −1st diffracted light L2 enters a light-sensitive surface 194a (FIG. 5).

On the light-sensitive surface 193a (FIG. 5), light spots L1Ab, L1Af, L1Bb, L1Bf, L1Cb, L1Cf, L1Db, and L1Df are created from the +1st diffracted light L1.

On the light-sensitive surface 194a (FIG. 5), light spots L2Ab, L2Af, L2Bb, L2Bf, L2Cb, L2Cf, L2Db, and L2Df are created from the −1st diffracted light L2.

The PA hologram 182 is designed so as to satisfy the following conditions (1) to (4) in a focused state (i.e., the size of the light spot converged on the recording face of information medium 105 becomes minimum):

(1) A light beam entering region A (FIG. 12) is converted into a first light beam which is converged at a point behind the light-sensitive surface 193a and a second light beam which is converged at a point in front of the light-sensitive surface 193a. The light spot L1Ab (FIG. 5) is formed by the first light beam, whereas the light spot L1Af is formed by the second light beam.

(2) A light beam entering region B (FIG. 12) is converted into a first light beam which is converged at a point behind the light-sensitive surface 193a and a second light beam which is converged at a point in front of the light-sensitive surface 193a. The light spot L1Bb (FIG. 5) is formed by the first light beam, whereas the light spot L1Bf is formed by the second light beam.

(3) A light beam entering region C (FIG. 12) is converted into a first light beam which is converged at a point behind the light-sensitive surface 193a and a second light beam which is converged at a point in front of the light-sensitive surface 193a. The light spot L1Cb (FIG. 5) is formed by the first light beam, whereas the light spot L1Cf is formed by the second light beam.

(4) A light beam entering region D (FIG. 12) is converted into a first light beam which is converged at a point behind the light-sensitive surface 193a and a second light beam which is converged at a point in front of the light-sensitive surface 193a. The light spot L1Db (FIG. 5) is formed by the first light beam, whereas the light spot L1Df is formed by the second light beam.

The −1st diffracted light L2 enters the light-sensitive surface 194a of the light detector 194 in such a manner that:

a light beam entering region A (FIG. 12) is incident on the light-sensitive surface 194a so as to form the light spots L2Ab and L2Af (FIG. 5);

a light beam entering region B (FIG. 12) is incident on the light-sensitive surface 194a so as to form the light spots L2Bb and L2Bf (FIG. 5);

a light beam entering region C (FIG. 12) is incident on the light-sensitive surface 194a so as to form the light spots L2Cb and L2Cf (FIG. 5);

a light beam entering region D (FIG. 12) is incident on the light-sensitive surface 194a so as to form the light spots L2Db and L2Df (FIG. 5);

The optical head device having the above-mentioned structure operates in the same manner as the optical head device 100. This optical head device provides an advantage in that it is unlikely to be affected by the imbalance in light amounts on the hologram surface because the two kinds of light spots used for detecting a focus error signal FE (i.e., the light spots formed on the light-sensitive surface 193a by a light beam which is converged at a point in front of the light-sensitive surface 193a and the light spots formed on the light-sensitive surface 193a by a light beam which is converged at a point behind the light-sensitive surface 193a) are generated from the same region on the PA hologram 182. As a result, a focus error signal FE having excellent characteristics can be obtained.

Furthermore, an optical information apparatus can be produced by using the optical head device according to Example 2. An optical information apparatus incorporating the optical head device according to Example 2 provides an advantage of excellent stability in reproducing information recorded on the information medium 105.

EXAMPLE 3

An optical head device according to Example 3 of the present invention is obtained by replacing the PA hologram 181 in Example 1 with a PA hologram 183 and replacing the LD-PD unit 161 in Example 1 with a LD-PD unit 162.

Figure 13:
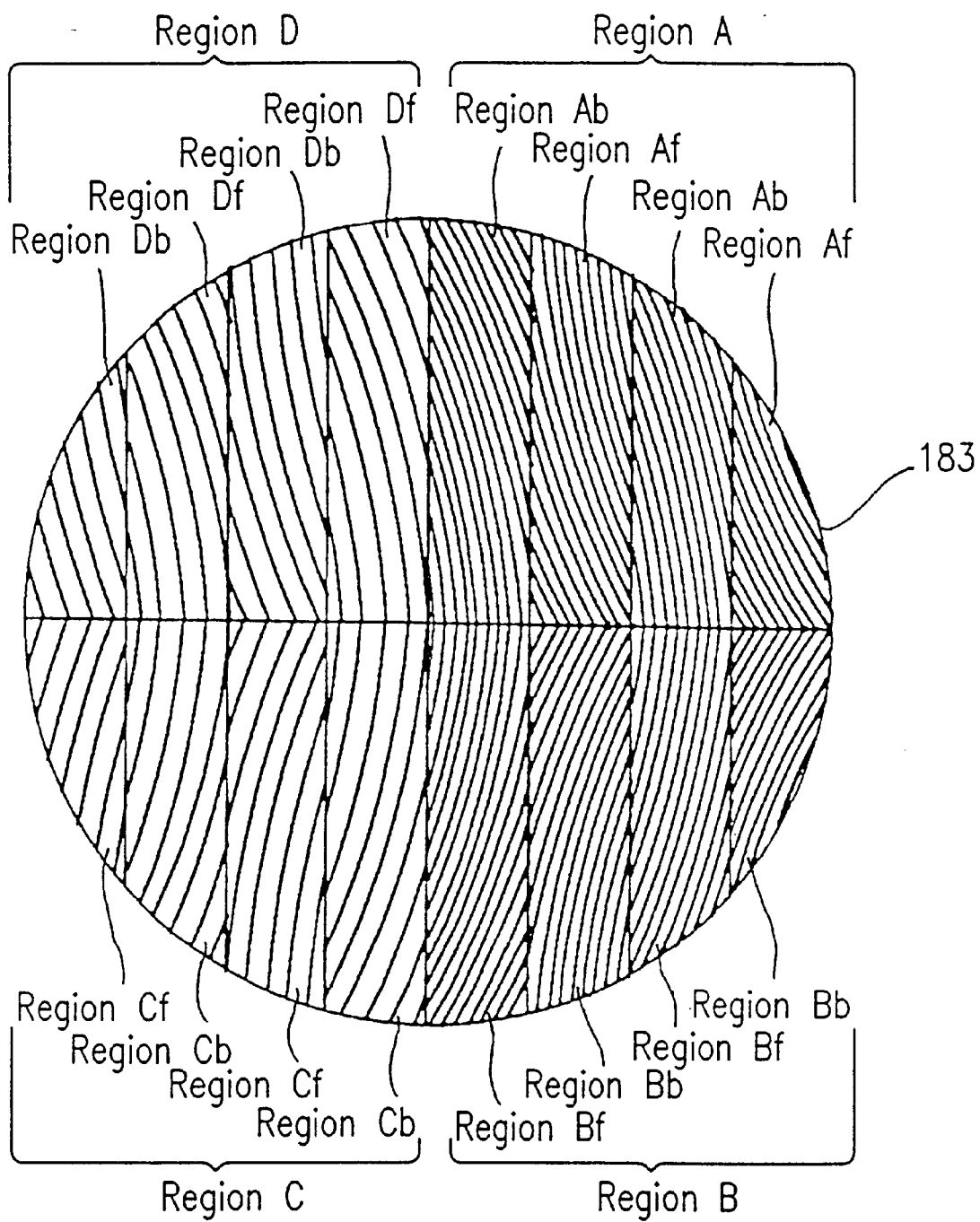
FIG. 13 is a schematic diagram illustrating patterns of a PA hologram 183.

FIG. 13 schematically illustrates patterns of the PA hologram 183. The PA hologram 183 is divided into four regions (regions A, B, C, and D) by a line which intersects the center of the PA hologram 183 and extends in parallel to the x axis and a line which intersects the center of the PA hologram 183 and extends in parallel to the y axis. Herein, the center of the PA hologram 183 coincides with its optic axis.

Each of regions A, B, C, and D is subdivided into a plurality of strip regions by a plurality of lines extending in parallel to the y axis. For example, regions Ab and regions Af alternate in region A; regions Bb and regions Bf alternate in region B; regions Cb and regions Cf alternate in region C; and regions Db and regions Df alternate in region D.

In FIG. 13, regions which are indicated by the same region name have a hologram pattern generated from the same function; regions which are indicated by different region names have hologram patterns generated from different functions. As a result, regions indicated by different region names diffract light beams in different directions or wave fronts.

Figure 14:
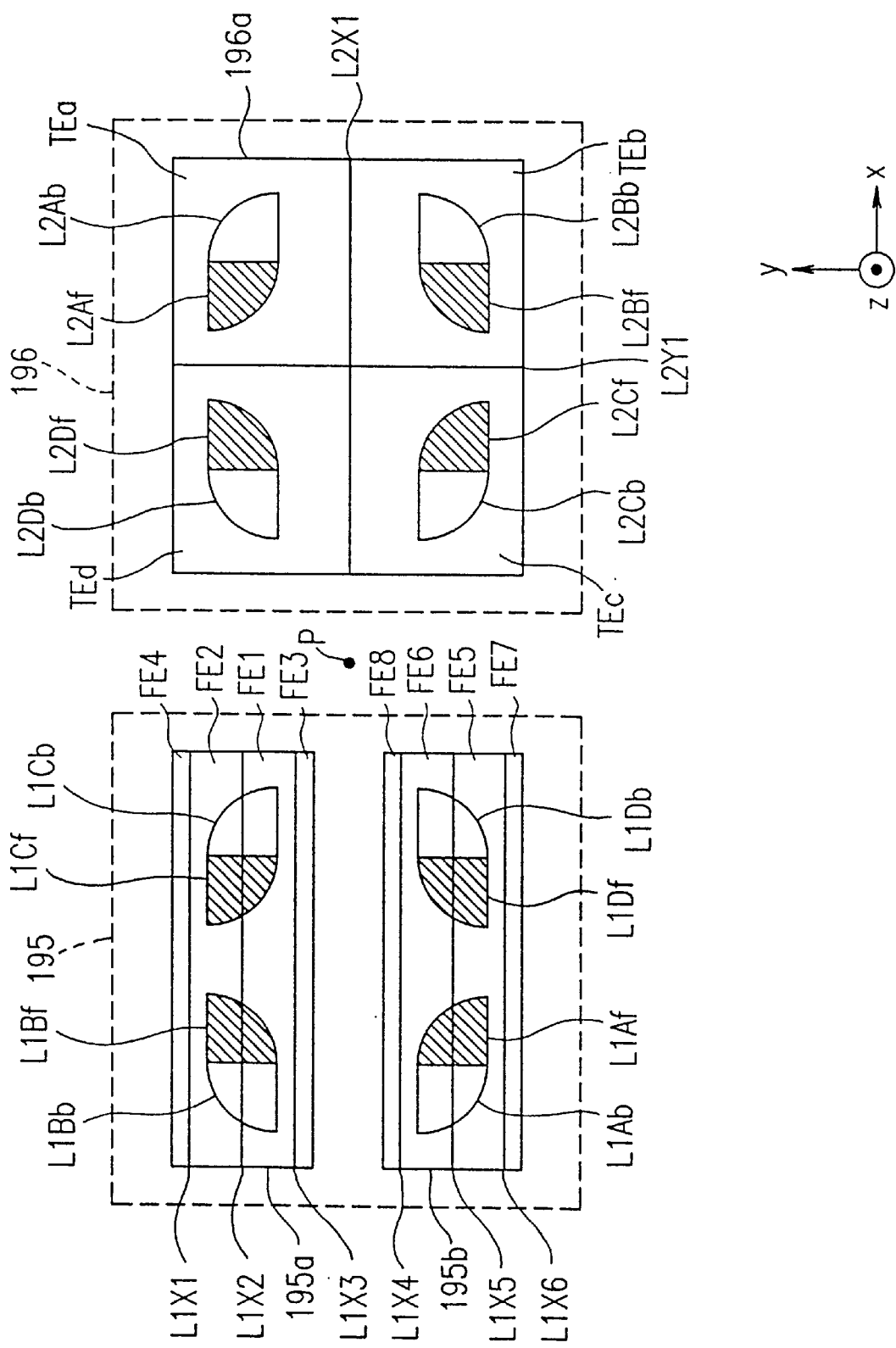
FIG. 14 is a schematic diagram illustrating a light-sensitive surfaces 195a and 195b of a light detector 195 and a light-sensitive surface 196a of a light detector 196.

FIG. 14 illustrates light-sensitive surfaces 195a and 195b of a light detector 195 and a light-sensitive surface 196a of a light detector 196 provided in the LD-PD unit 162.

The light-sensitive surface 195a and the light-sensitive surface 195b are arranged along the y-axis direction.

The light-sensitive surfaces 195a, 195b, and 196a are disposed in a symmetrical manner with respect to an emission point (i.e., a point from which the light beam L0 is emitted) or a point equivalent to the emission point. In FIG. 14, point P represents the emission point or a point equivalent to the emission point.

The light-sensitive surface 195a is divided into four regions (regions FE1, FE2, FE3, and FE4) by three lines L1X1, L1X2, and L1X3 extending in parallel to the x axis.

The light-sensitive surface 195b is divided into four regions (regions FE5, FE6, FE7, and FE8) by three lines L1X4, L1X5, and L1X6 extending in parallel to the x axis.

The light-sensitive surface 196a is divided into four regions (regions TEa, TEb, TEc, and TEd) by a line L2X1 extending in parallel to the x axis and a line L2Y1 extending in parallel to the y axis.

Due to the diffraction action of the PA hologram 183, the light beam reflected from the information medium 105 is converted into the +1st diffracted light L1 and the −1st diffracted light L2. The +1st diffracted light L1 enters the light-sensitive surfaces 195a and 195b, whereas the −1st diffracted light L2 enters the light-sensitive surface 196a.

Light spots L1Bb, L1Bf, L1Cb, and L1Cf are formed on the light-sensitive surface 195a from the +1st diffracted light L1. The light spots L1Bb, L1Bf, L1Cb, and L1Cf respectively correspond to the light beams entering regions Bb, Bf, Cb, and Cf of the PA hologram 183.

Light spots L1Ab, L1Af, L1Db, and L1Df are formed on the light-sensitive surface 195b from the +1st diffracted light L1. The light spots L1Ab, L1Af, L1Db, and L1Df respectively correspond to the light beams entering regions Ab, Af, Db, and Df of the PA hologram 183.

Light spots L2Ab, L2Af, L2Bb, L2Bf, L2Cb, L2Cf, L2Db, and L2Df are formed on the light-sensitive surface 196a from the −1st diffracted light L2. The light spots L2Ab, L2Af, L2Bb, L2Bf, L2Cb, L2Cf, L2Db, and L2Df respectively correspond to the light beams entering regions Ab, Af, Bb, Bf, Cb, Cf, Db, and Df of the PA hologram 183.

The PA hologram 183 is designed so as to satisfy the following conditions (1) to (4) in a focused state (i.e., the size of the light spot converged on the recording face of information medium 105 becomes minimum):

(1) A light beam entering region Ab (FIG. 13) is converged at a point behind the light-sensitive surface 195b, whereas a light beam entering region Af (FIG. 13) is converged at a point in front of the light-sensitive surface 195b. The light spots L1Ab and L1Af are formed astride regions FE5 and FE6 of the light-sensitive surface 195b.

(2) A light beam entering region Bb (FIG. 13) is converged at a point behind the light-sensitive surface 195a, whereas a light beam entering region Bf (FIG. 13) is converged at a point in front of the light-sensitive surface 195a. The light spots L1Bb and L1Bf are formed astride regions FE1 and FE2 of the light-sensitive surface 195a.

(3) A light beam entering region Cb (FIG. 13) is converged at a point behind the light-sensitive surface 195a, whereas a light beam entering region Cf (FIG. 13) is converged at a point in front of the light-sensitive surface 195a. The light spots L1Cb and L1Cf are formed astride regions FE1 and FE2 of the light-sensitive surface 195a.

(4) A light beam entering region Db (FIG. 13) is converged at a point behind the light-sensitive surface 195b, whereas a light beam entering region Df (FIG. 13) is converged at a point in front of the light-sensitive surface 195b. The light spots L1Db and L1Df are formed astride regions FE5 and FE6 of the light-sensitive surface 195b.

The light detector 195 generates a focus error signal FE in accordance with equation 10 below.

$$FE = \{(S_{FE1} + S_{FE6}) - (S_{FE2} + S_{FE5})\} - \{(S_{FE3} + S_{FE8}) - (S_{FE4} + S_{FE7})\} \qquad \text{eq. 10}$$

where $S_{FE1}$ to $S_{FE4}$ represent the respective signals detected in regions FE1 to FE4 of the light-sensitive surface 195a; and $S_{FE5}$ to $S_{FE8}$ represent the respective signals detected in regions FE5 to FE8 of the light-sensitive surface 195b.

From eq. 10, it can be seen that the focus error signal FE converges to zero more quickly than conventionally as the information medium 105 is displaced farther away from the focused position because of the effect of the term $\{(S_{FE3}+S_{FE8})-(S_{FE4}+S_{FE7})\}$ of eq. 10.

Equation 10 can be modified into equation 11 as follows:

$$\begin{aligned}FE &= \{(S_{FE1} + S_{FE6}) - (S_{FE2} + S_{FE5})\} - \\ &\quad \{(S_{FE3} + S_{FE8}) - (S_{FE4} + S_{FE7})\} \\ &= \{(S_{FE1} + S_{FE4}) - (S_{FE2} + S_{FE3})\} + \\ &\quad \{(S_{FE6} + S_{FE7}) - (S_{FE5} + S_{FE8})\}\end{aligned} \qquad \text{eq. 11}$$

Equation 11 indicates that the focus error signal FE defined by eq. 10 is obtained by summing the differential signal $\{(S_{FE1}+S_{FE4})-(S_{FE2}+S_{FE3})\}$ between a sum of the signals detected in regions FE1 and FE4 and a sum of the signals detected in regions FE2 and FE3, and the differential signal $\{(S_{FE6}+S_{FE7})-(S_{FE5}+S_{FE8})\}$ between a sum of the signals detected in regions FE6 and FE7 and a sum of the signals detected in regions FE5 and FE8.

Such mathematical operations can be achieved by, for example, electrically connecting region FE4 to region FE1, electrically connecting region FE3 to region FE2, electrically connecting region FE7 to region FE6, and electrically connecting region FE8 to region FE5.

Figure 15:
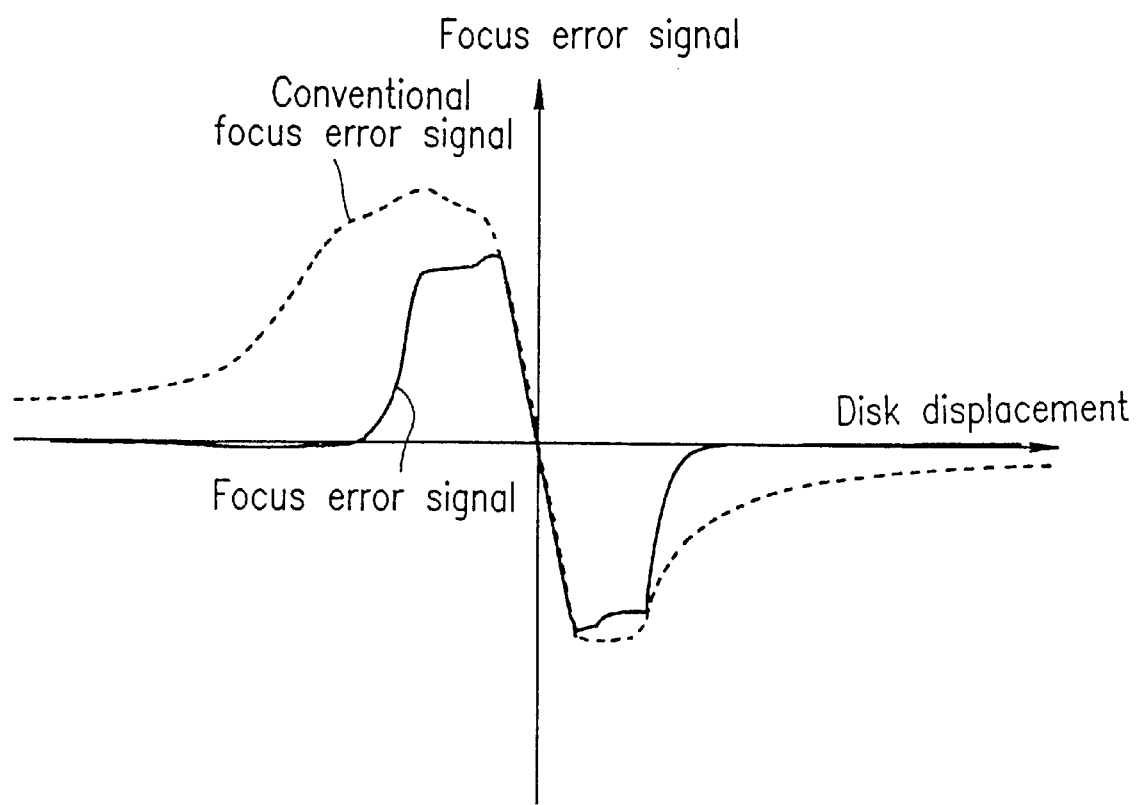
FIG. 15 is a graph illustrating the characteristics of a focus error signal obtained with an optical head device according to the present invention.

FIG. 15 shows the relationship between the displacement of the information medium 105 (from a focused position) and the focus error signal FE in the optical head device according to Example 3.

As seen from FIG. 15, the value of the focus error signal FE becomes substantially zero when the information medium 105 is at a position sufficiently remote from the focused position. Moreover, it can be seen that it provides improved symmetry between the characteristics profile of the focus error signal FE representing displacements of the information medium 105 away from the focused position and the characteristics profile of the focus error signal FE representing displacements of the information medium 105 toward the focused position. As a result, an optical head device can be realized which prevents focusing offsets from occurring even in reproducing information recorded on a double-layer disk.

Furthermore, an optical information apparatus can be produced by using the optical head device according to Example 3. An optical information apparatus incorporating the optical head device according to Example 3 provides an advantage of excellent stability in reproducing information recorded on the information medium 105, even if the information medium 105 is a double-layer disk.

The light detector 196 generates a tracking error signal TE. The tracking error signal TE can be generated in either a push-pull method or a phase difference method, depending on the type of the information medium 105. The push-pull method is employed in the case where the information medium 105 is an optical disk having continuous grooves (e.g., a read/write optical disk). The phase difference method is employed in the case where the information medium 105 is an optical disk carrying track information in the form of pits (e.g., a ROM optical disk).

In the case where the push-pull method is employed, the tracking error signal TE is generated in accordance with equation 12 below:

$$TE = (S_{TEa} + S_{TEb}) - (S_{TEc} + S_{TEd}) \qquad \text{eq. 12}$$

where $S_{TEa}$ to $S_{TEd}$ represent the respective signals detected in regions TEa to TEd of the light-sensitive surface 196a.

In the case where the phase difference method is employed, the tracking error signal TE is generated based on a comparison between the phase of the sum signal ($S_{TEa}+S_{TEc}$) and the phase of the sum signal ($S_{TEb}+S_{TEd}$).

A signal representing the information recorded on the information medium 105 can be obtained by summing up all the signals detected in the respective regions of the light-sensitive surfaces 195a and 195b of the light detector 195. Alternatively, such an information signal can be obtained by summing up all the signals detected in the respective regions of the light-sensitive surface 196a of the light detector 196. Alternatively, such an information signal can be obtained by summing up all the signals detected in the respective regions of the light-sensitive surfaces 195a and 195b of the light detector 195 and all the signals detected in the respective regions of the light-sensitive surface 196a of the light detector 196.

EXAMPLE 4

It is also possible to realize an optical head device which has both the features described in Example 1 and the features described in Example 3.

An optical head device according to Example 4 of the present invention is obtained by replacing the LD-PD unit 161 in Example 1 with a LD-PD unit 163.

Figure 16:
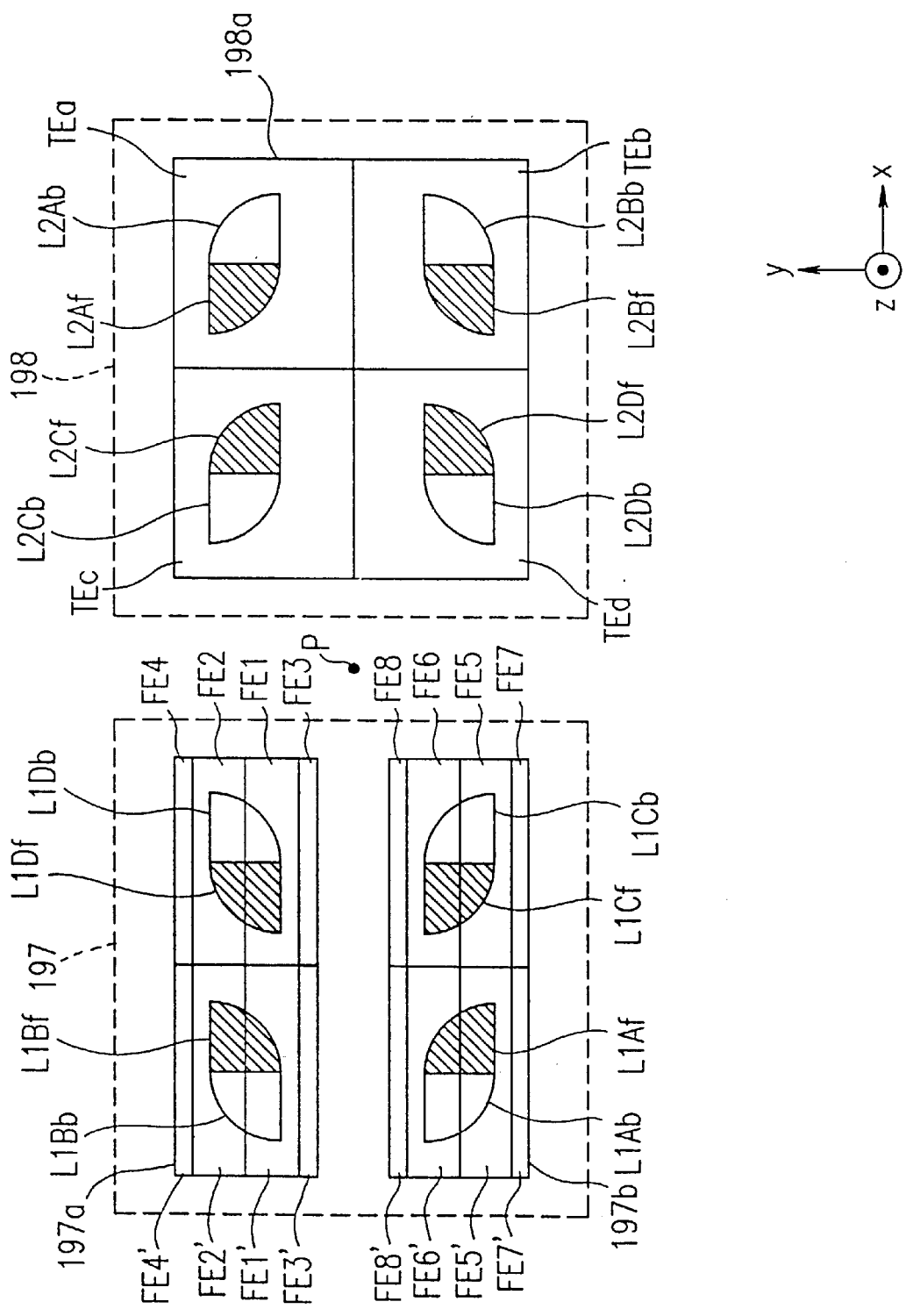
FIG. 16 is a schematic diagram illustrating a light-sensitive surfaces 197a and 197b of a light detector 197 and a light-sensitive surface 198a of a light detector 198.

FIG. 16 illustrates light-sensitive surfaces 197a and 197b of a light detector 197 and a light-sensitive surface 198a of a light detector 198 provided in the LD-PD unit 163.

The relationship between the respective light spots and the respective regions of the PA hologram 181 in FIG. 16 is the same as in Example 1.

The light detector 197 generates a focus error signal FE in accordance with equation 13 below.

$$FE = \{(S_{FE1} + S_{FE6}) - (S_{FE2} + S_{FE5})\} - \\ \{(S_{FE3} + S_{FE8}) - (S_{FE4} + S_{FE7})\} - \\ \{(S_{FE1'} + S_{FE6'}) - (S_{FE2'} + S_{FE5'})\} + \\ \{(S_{FE3'} + S_{FE8'}) - (S_{FE4'} + S_{FE7'})\} \quad \text{eq. 13}$$

where $S_{FE1}$ to $S_{FE4}$ and $S_{FE1'}$ to $S_{FE4'}$ represent the respective signals detected in regions FE1 to FE4 and regions FE1' to FE4' of the light-sensitive surface 197a; and $S_{FE5}$ to $S_{FE8}$ and $S_{FE5'}$ to $S_{FE8'}$ represent the respective signals detected in regions FE5 to FE8 and FE5' to FE8' of the light-sensitive surface 197b.

In accordance with the above structure, the optical head device according to Example 4 provides both the features described in Example 1 and the features described in Example 3.

Furthermore, an optical information apparatus can be produced by using the optical head device according to Example 4. An optical information apparatus incorporating the optical head device according to Example 4 provides an advantage of excellent stability in reproducing information recorded on the information medium 105.

Figure 17:
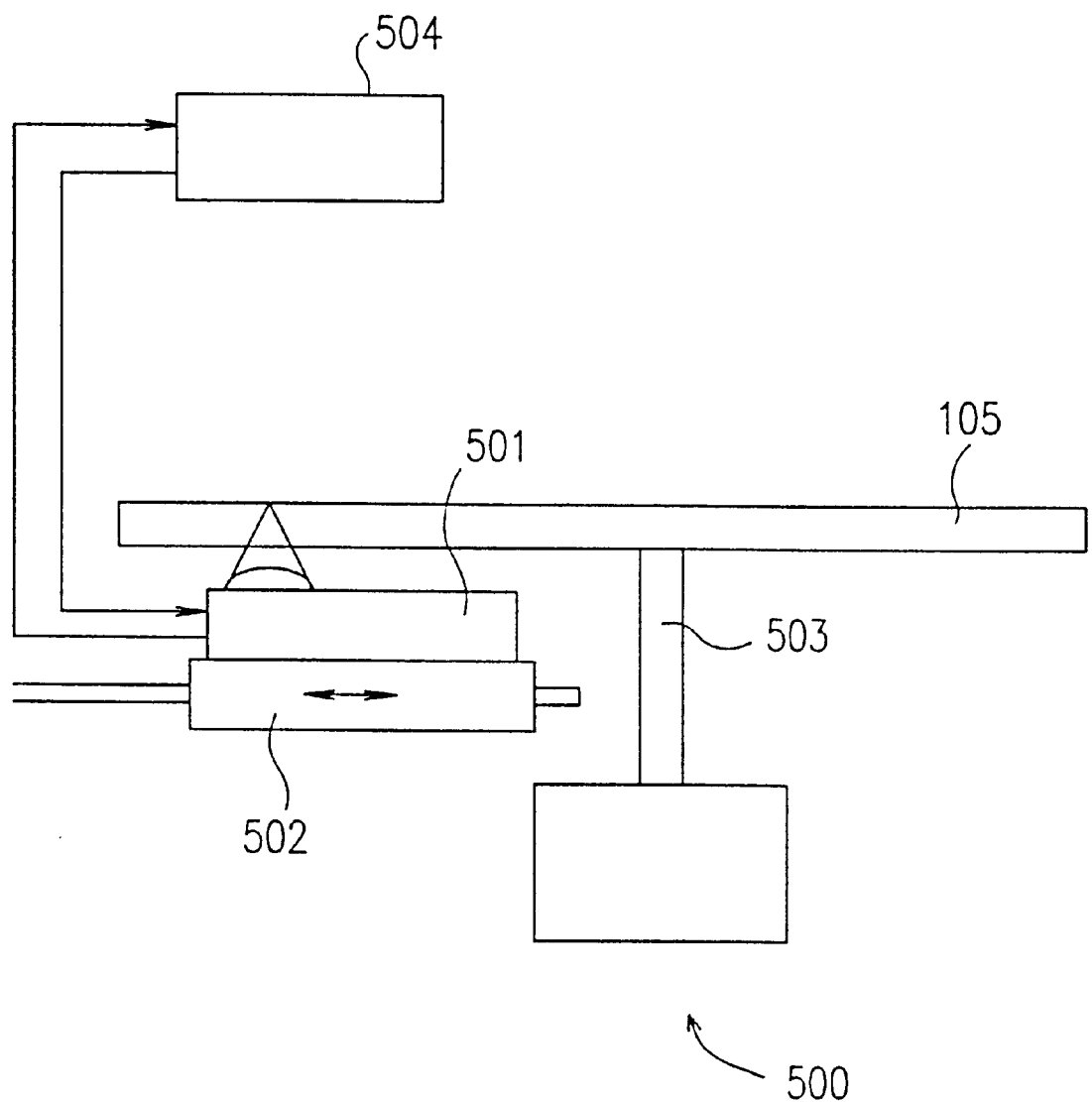
FIG. 17 is a schematic view illustrating the structure of an optical information apparatus 500.
Figure 18:
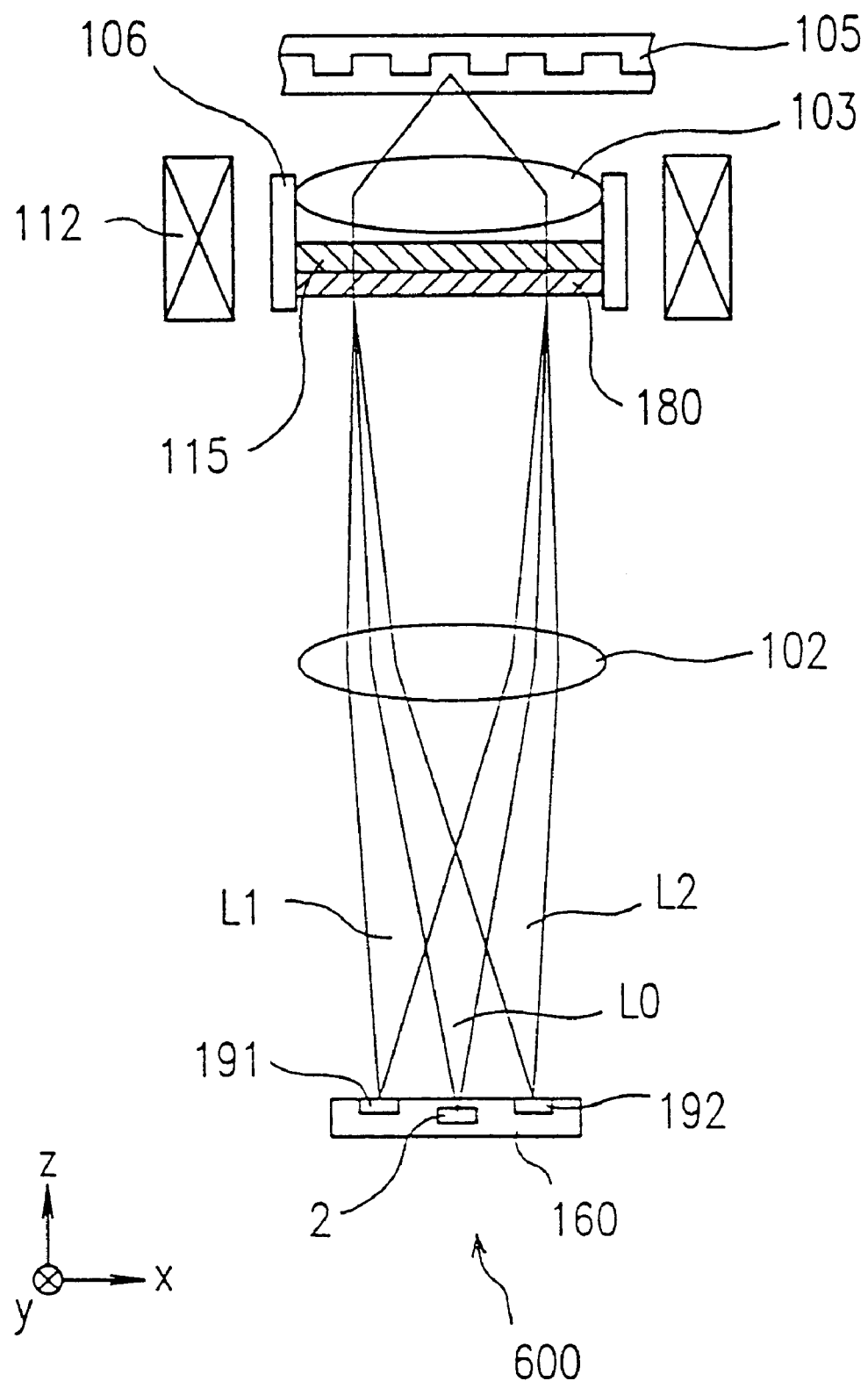
FIG. 18 is a schematic view illustrating the structure of a conventional optical head device 600.
Figure 20:
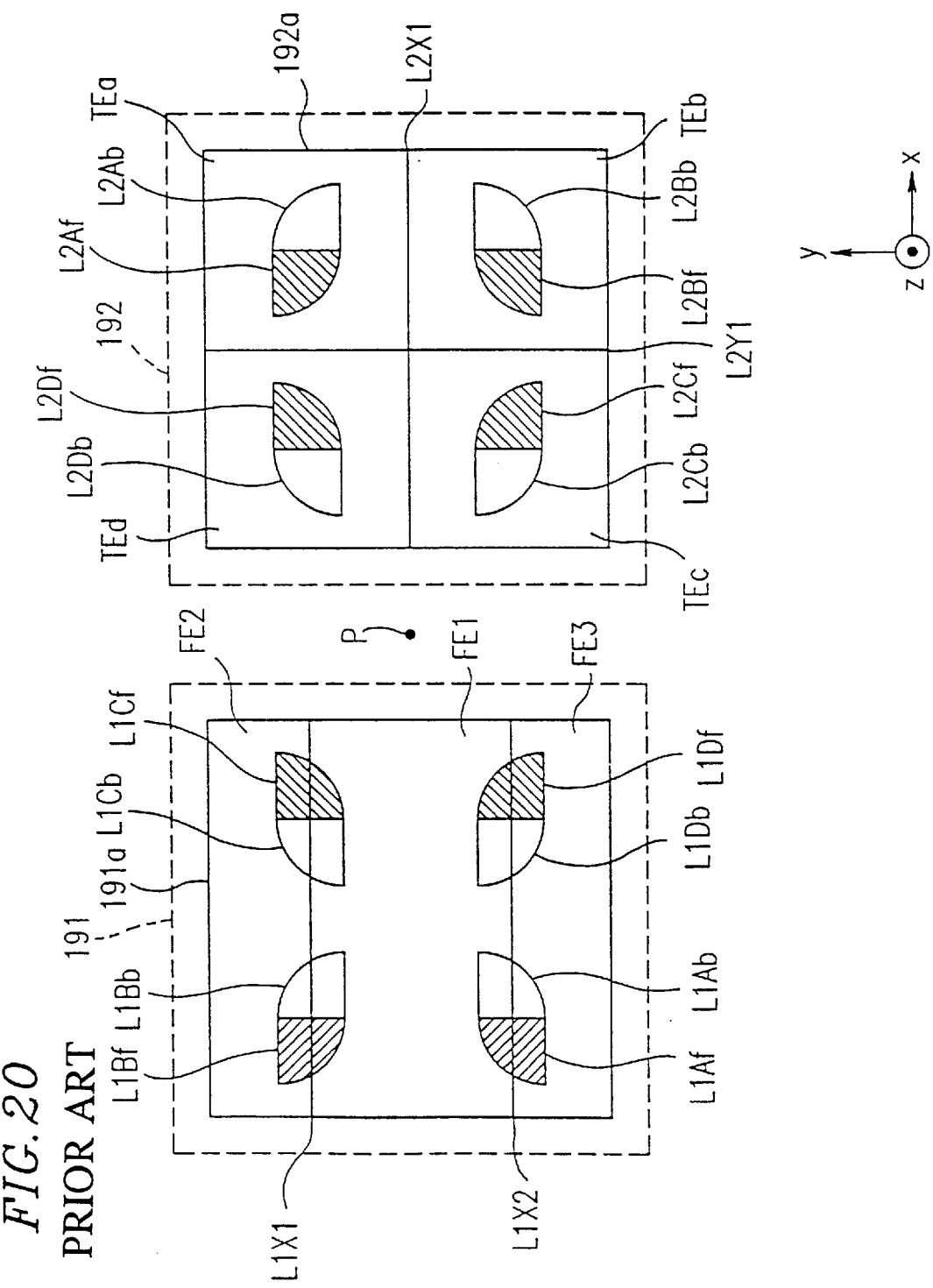
FIG. 20 is a schematic diagram illustrating a light-sensitive surface 191a of a light detector 191 and a light-sensitive surface 192a of a light detector 192.
Figure 21:
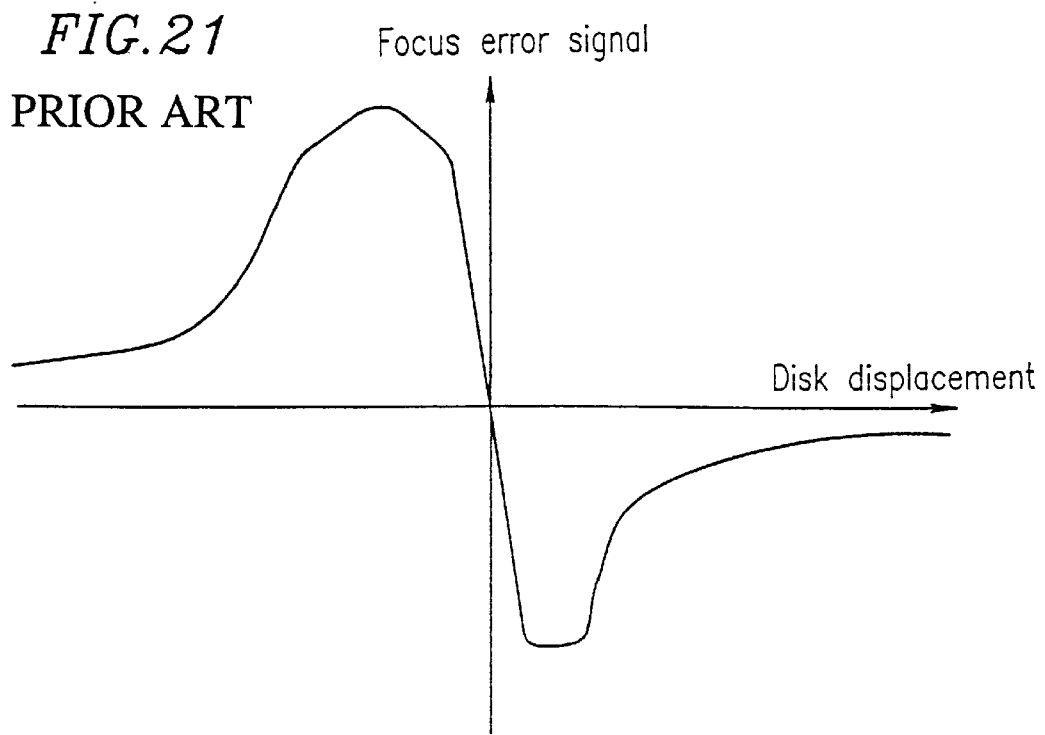
FIG. 21 is a graph illustrating the characteristics of a focus error signal obtained with a conventional optical head device.
Figure 22:
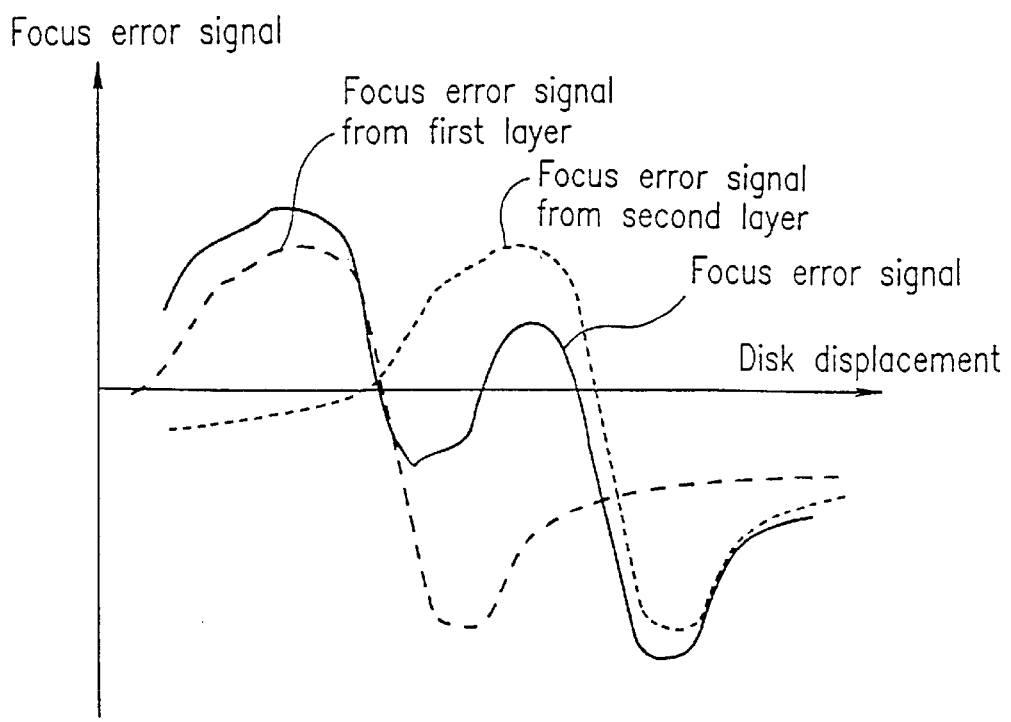
FIG. 22 is a graph illustrating the characteristics of a focus error signal obtained by using a conventional optical head device for reproducing a signal recorded on a double-layer disk.

FIG. 17 illustrates the structure of an optical information apparatus 500. The optical information apparatus 500 includes an optical head device 501, a driving device 502 for driving the optical head device 501, a disk rotation mechanism 503 for controlling the rotation of an information medium 105, and an electric circuit 504 for transmitting/receiving signals to/from the optical head device 501. The optical head device 501 can be any one of the optical head devices described in Examples 1 to 4.

The disk rotation mechanism 503 controls the rotation of the information medium 105. The driving device 502 drives the optical head device 501 so as to position the optical head device 501 in the vicinity of a desired one of plurality of tracks included in the information medium 105. The optical head device 501 records information in the desired track or reproduces the information which has been recorded in the desired track.

Furthermore, the optical head device 501 generates a focus error signal and/or a tracking error signal in accordance with the relative positions of the optical head device 501 and the information medium 105, and outputs such signals to the electric circuit 504. The electric circuit 504 generates a signal for adjusting the position of the object lens included in the optical head device 501 in accordance with such signals, and outputs the generated signal to the optical head device 501. Thus, the optical head device 501 performs focusing servo and tracking servo for the optical head device 501.

An optical information apparatus capable of accurately and stably reproducing the information recorded on the information medium 105 can be provided by utilizing an optical head device according to the present invention as the optical head device 501 for providing a stable focus error signal.

As will be apparent from the above description, the invention described herein makes possible the advantages of (1) providing an optical head device in which no focusing offset occurs even in the case where the wavelength of a light beam and/or the focal length of a lens deviates from its design value; (2) providing an optical head device having a focus error signal characteristics profile with good symmetry; and (3) providing an optical head device in which the focus error signal more quickly converges to zero as the displacement of the optical disk from a focused position increases (in other words, the profile of the focus error signal FE characteristics does not spread out on both sides).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head device comprising:

a light source for emitting a light beam having a predetermined wavelength;

an optical system for converging the light beam emitted from the light source on an information medium;

a holographic optical element for converting the light beam reflected from the information medium into diffracted light; and a light detector including a plurality of pairs of photodetectors, for detecting a focus error based on the diffracted light, wherein each of the plurality of pairs of photodetectors has a boundary line dividing one photodetector from the other photodetector of the pair, the holographic optical element changes an angle of the diffracted light in response to a deviation of the predetermined wavelength of the light beam so as to cause an offset in the position of light spots corresponding to the diffracted light formed on the boundary line of each of the plurality of pairs of photodetectors, the plurality of pairs of photodetectors are arranged so that a direction of the offset in the position of the light spot crosses the boundary line, and the light detector generates a focus error signal indicating the focus error based on differential signals output from each pair of the plurality of pairs of photodetectors by canceling the fluctuations in the respective differential signals output from the plurality of pairs of photodetectors due to the offset in the position of the light spots by one another.

2. An optical head device according to claim 1, wherein the holographic optical element converts the light beam into +1st diffracted light and −1st diffracted light, and the light beam reflected from the information medium is incident on the light detector via the holographic optical element.

3. An optical head device according to claim 1, wherein the optical head device further includes a further light detector for detecting a tracking error signal, such that the +1st diffracted light is incident on the light detector and the −1st diffracted light is incident on the further light detector.

4. An optical head device according to claim 1, wherein the plurality of pairs of photodetectors include a first pair of photodetectors and a second pair of photodetectors; and a fluctuation in a differential signal generated by the first pair of photodetectors is cancelled by a fluctuation in the differential signal generated by the second pair of photodetectors.

5. An optical head device according to claim 4, wherein the first pair of photodetectors and the second pair of photodetectors are arranged along a direction which is substantially perpendicular to a tangential direction of the information medium.

6. An optical head device comprising:
a light source for emitting a light beam having a predetermined wavelength;
an optical system for converging the light beam emitted from the light source on an information recording layer of an information medium;
a holographic optical element for converting the light beam reflected from the information recording layer into diffracted light; and
a light detector including a light-sensitive surface, for detecting a focus error based on the diffracted light, wherein
the light-sensitive surface has first, second, third, and fourth regions, the first, second, third, and fourth regions being arranged along a tangential direction of the information medium in the following order: the third region; the first region; the second region; and the fourth region,
the light detector generates a focus error signal indicating the focus error based on a differential signal between a sum of signals detected in the first region and the fourth region and a sum of signals detected in the second region and the third region,
the size of a light spot corresponding to the diffracted light varies according to a displacement of the information recording layer, and
the first, second, third, and fourth regions are arranged so that a light spot corresponding to the diffracted light is formed astride only the first and the second regions when the information recording layer is in a focused position and the differential signal becomes substantially zero when the information recording layer is displaced from the focused position by more than a predetermined distance.

7. An optical head device according to claim 6, wherein the holographic optical element converts the light beam into +1st diffracted light and −1st diffracted light, and the light beam reflected from the information medium is incident on the light detector via the holographic optical element.

8. An optical head device according to claim 6, wherein the optical head device further includes a further light detector for detecting a tracking error signal, such that the +1st diffracted light is incident on the light detector and the −1st diffracted light is incident on the further light detector.

9. An optical information apparatus comprising an optical head device, a driving device for driving the optical head device, and a rotation mechanism for rotating the information medium, wherein the optical head device comprises:
a light source for emitting a light beam having a predetermined wavelength;
an optical system for converging the light beam emitted from the light source on an information medium;
a holographic optical element for converting the light beam reflected from the information medium into diffracted light; and
a light detector including a plurality of pairs of photodetectors, for detecting a focus error based on the diffracted light, each of the plurality of pairs of photodetectors has a boundary line dividing one photodetector from the other photodetector of the pair, the holographic optical element changes an angle of the diffracted light in response to a deviation of the predetermined wavelength of the light beam so as to cause an offset in the position of light spots corresponding to the diffracted light formed on the boundary line of each of the plurality of pairs of photodetectors, the plurality of pairs of photodetectors are arranged so that a direction of the offset in the position of the light spot crosses the boundary line, and the light detector generates a focus error signal indicating the focus error based on differential signals output from each pair of the plurality of pairs of photodetectors by canceling the fluctuations in the respective differential signals output from the plurality of pairs of photodetectors due to the offset in the position of the light spots by one another.

10. An optical information apparatus comprising an optical head device, a driving device for driving the optical head device, and a rotation mechanism for rotating the information medium, wherein the optical head device comprises:
a light source for emitting a light beam having a predetermined wavelength;
an optical system for converging the light beam emitted from the light source on an information recording layer of an information medium;
a holographic optical element for converting the light beam reflected from the information recording layer into diffracted light; and
a light detector including a light-sensitive surface, for detecting a focus error based on the diffracted light, wherein the light-sensitive surface has first, second, third, and fourth regions, the first, second, third, and fourth regions being arranged along a tangential direction of the information medium in the following order: the third region; the first region; the second region; and the fourth region, the light detector generates a focus error signal indicating the focus error based on a differential signal between a sum of signals detected in the first region and the fourth region and a sum of signals detected in the second region and the third region, the size of a light spot corresponding to the diffracted light varies according to a displacement of the information recording layer, and the first, second, third, and fourth regions are arranged so that a light spot corresponding to the diffracted light is formed astride only the first and the second regions when the information recording layer is in a focused position and the differential signal becomes substantially zero when the information recording layer is displaced from the focused position by more than a predetermined distance.

11. A method for detecting a focus error signal by using a light detector for receiving a diffracted light from a holographic optical element for converting a light beam reflected from an information medium into the diffracted light, the light detector including a plurality of pairs of photodetectors, the method comprising the step of:

generating the focus error signal based on a signal output from each of the plurality of pairs of photodetectors having a boundary line dividing one photodetector from the other photodetector of the pair, wherein the holographic optical element changes an angle of the diffracted light in response to a deviation of a predetermined wavelength of the light beam so as to cause an offset in the position of light spots corresponding to the diffracted light formed on the boundary line of each of the plurality of pairs of photodetectors, the plurality of pairs of photodetectors are arranged so that a direction of the offset in the position of the light spot crosses the boundary line, and the light detector generates a focus error signal indicating the focus error based on differential signals output from each pair of the plurality of pairs of photodetectors by canceling the fluctuations in the respective differential signals output from the plurality of pairs of photodetectors due to the offset in the position of the light spots by one another.

12. A method for detecting a focus error signal by using a light detector for receiving a diffracted light from a holographic optical element for converting a light beam reflected from an information recording layer of an information medium into the diffracted light, the light detector including a light-sensitive surface having first, second, third, and fourth regions, the first, second, third, and fourth regions being arranged along a tangential direction of the information medium in the following order: the third region; the first region; the second region; and the fourth region, the method comprising the step of:

generating the focus error signal based on a differential signal between a sum of signals detected in the first region and the fourth region and a sum of signals detected in the second region and the third region, wherein the size of a light spot corresponding to the diffracted light varies according to a displacement of the information recording layer, and the first, second, third, and fourth regions are arranged so that a light spot corresponding the diffracted light is formed astride only the first and the second regions when the information recording layer is in a focused position and the differential signal becomes substantially zero when the information recording layer is displaced from the focused position by more than a predetermined distance.

13. An optical head device comprising:

a light source for emitting a light beam having a predetermined wavelength;

an optical system for converging the light beam emitted from the light source on an information medium;

a holographic optical element for converting the light beam reflected from the information medium into plurality of diffracted light beams; and a light detector including a plurality of photodetectors, for detecting a focus error based on the plurality of diffracted light beams, wherein each of the plurality of photodetectors has a boundary line dividing one photodetector from the other photodetector, the holographic optical element changes an angle of the plurality of diffracted light beams in response to a deviation of the predetermined wavelength of the light beam so as to cause an offset in the position of a plurality of light spots corresponding to the plurality of diffracted light beams formed on the boundary line of each of the plurality of photodetectors, the plurality of photodetectors are arranged so that a direction of the offset in the position of the light spot crosses the boundary line, and the light detector generates a focus error signal indicating the focus error based on differential signals output from the plurality of photodetectors by canceling the fluctuations in the respective differential signals output from the plurality of photodetectors due to the offset in the position of the light spots by one another.

14. An optical head device according to claim 13, wherein the light detector is divided into six regions.

15. An optical head device according to claim 1, wherein the plurality of pairs of photodetectors are asymmetric in size about the boundary line dividing the one photodetector from the other photodetector of the pair.

16. An optical head device according to claim 13, wherein the light spot is comprised of a first light impinging the light sensitive surface from a first light beam which is converged at a point behind the light sensitive surface and a second light impinging the light sensitive surface from a second light beam which is converged at a point in front of the light sensitive surface.

* * * * *